US010156996B2

(12) United States Patent
Hayakawa et al.

(10) Patent No.: US 10,156,996 B2
(45) Date of Patent: Dec. 18, 2018

(54) MEMORY DEVICE AND READ PROCESSING METHOD USING READ COUNTS, FIRST, SECOND, AND THIRD ADDRESSES

(71) Applicant: TOSHIBA MEMORY CORPORATION, Minato-ku (JP)

(72) Inventors: Hideki Hayakawa, Kamakura (JP); Takumi Watanabe, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 68 days.

(21) Appl. No.: 15/444,990

(22) Filed: Feb. 28, 2017

(65) Prior Publication Data

US 2018/0067650 A1    Mar. 8, 2018

Related U.S. Application Data

(60) Provisional application No. 62/384,047, filed on Sep. 6, 2016.

(51) Int. Cl.
*G06F 12/00* (2006.01)
*G06F 13/00* (2006.01)
*G06F 13/28* (2006.01)
*G06F 9/26* (2006.01)
*G06F 9/34* (2018.01)
(Continued)

(52) U.S. Cl.
CPC ............ *G06F 3/061* (2013.01); *G06F 3/0655* (2013.01); *G06F 3/0685* (2013.01); *G06F 12/0238* (2013.01); *G06F 12/0638* (2013.01); *G06F 12/1009* (2013.01); *G06F 3/0614* (2013.01); *G06F 12/10* (2013.01); *G06F 2212/205* (2013.01); *G06F 2212/7201* (2013.01)

(58) Field of Classification Search
CPC ...... G06F 3/061; G06F 3/0614; G06F 3/0655; G06F 3/0685; G06F 12/0238; G06F 12/0638; G06F 12/122; G06F 12/10; G06F 12/1009; G06F 2212/7201; G06F 2212/205
USPC .......................... 711/103, 104, 133, 136, 206
See application file for complete search history.

(56) References Cited

U.S. PATENT DOCUMENTS

2007/0101047 A1  5/2007  Kamiya et al.
2012/0215965 A1  8/2012  Inada et al.
(Continued)

FOREIGN PATENT DOCUMENTS

| JP | 2007-280329 | 10/2007 |
| JP | 4442771 | 3/2010 |
| JP | 5295286 | 9/2013 |

*Primary Examiner* — Shane Woolwine
(74) *Attorney, Agent, or Firm* — Oblon, McClelland, Maier & Neustadt, L.L.P.

(57) ABSTRACT

According to one embodiment, a memory device includes a nonvolatile memory, a volatile memory, and a controller which writes a first data table including a first data group including a first logical address corresponding to a first physical and a first count value and a second data group including a second logical address corresponding to a second physical address and a second count value, to the volatile memory, reads the first data table when a third logical address is requested to be read, compares the first count value and the second count value with each other, and rewrites the first data group or the second data group to a third data group including a third logical address based on a result of the comparison.

20 Claims, 20 Drawing Sheets

(51) Int. Cl.
  *G06F 3/06* (2006.01)
  *G06F 12/02* (2006.01)
  *G06F 12/06* (2006.01)
  *G06F 12/1009* (2016.01)
  *G06F 12/10* (2016.01)

(56) References Cited

U.S. PATENT DOCUMENTS

2013/0080703 A1* 3/2013 Kumagai .............. G06F 9/5072
 711/117
2013/0179646 A1* 7/2013 Okubo ................ G06F 12/0238
 711/154
2015/0143032 A1* 5/2015 Hashimoto ............. G06F 3/061
 711/103
2016/0371019 A1* 12/2016 Kang .................... G06F 3/0616

* cited by examiner

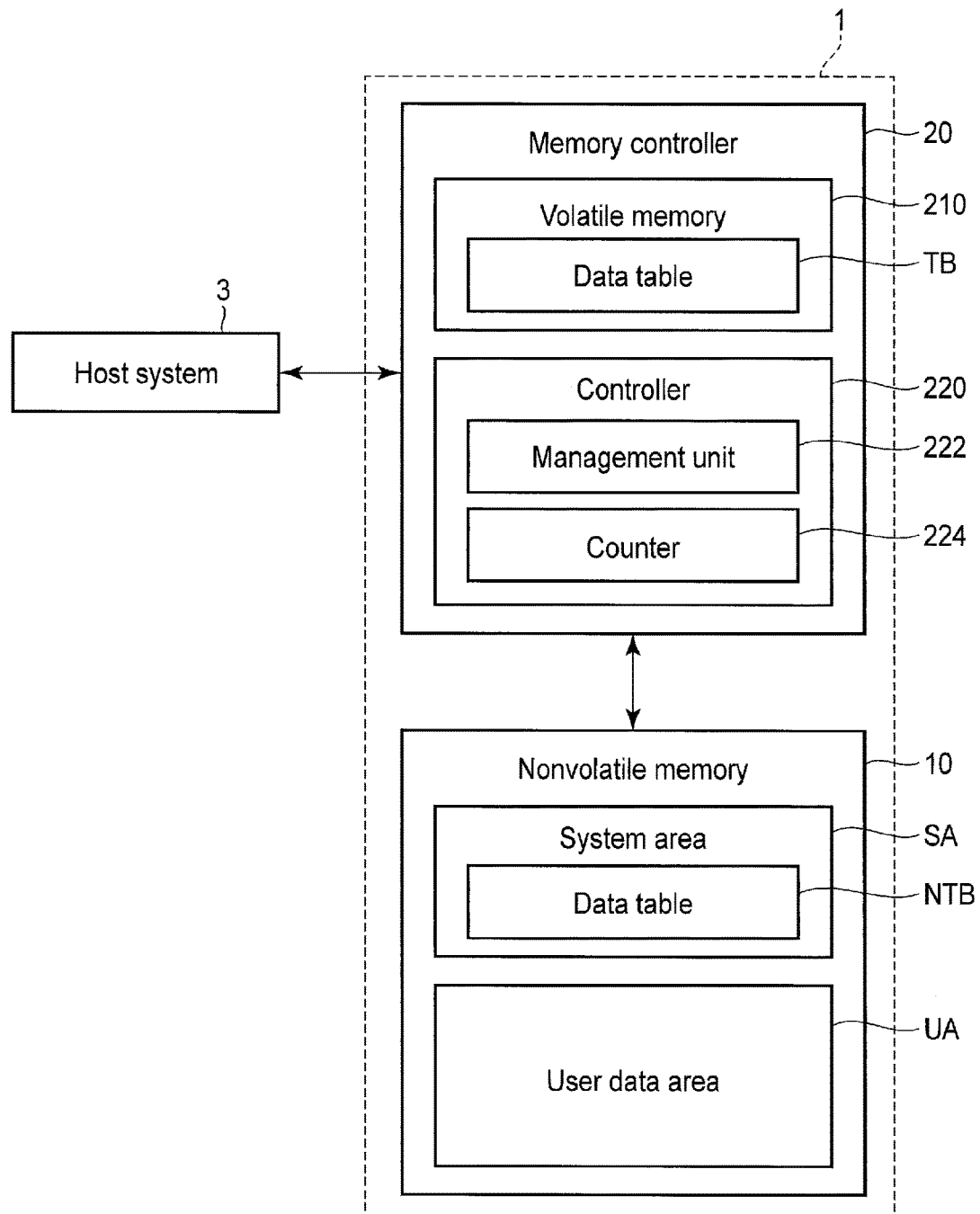
F I G. 1

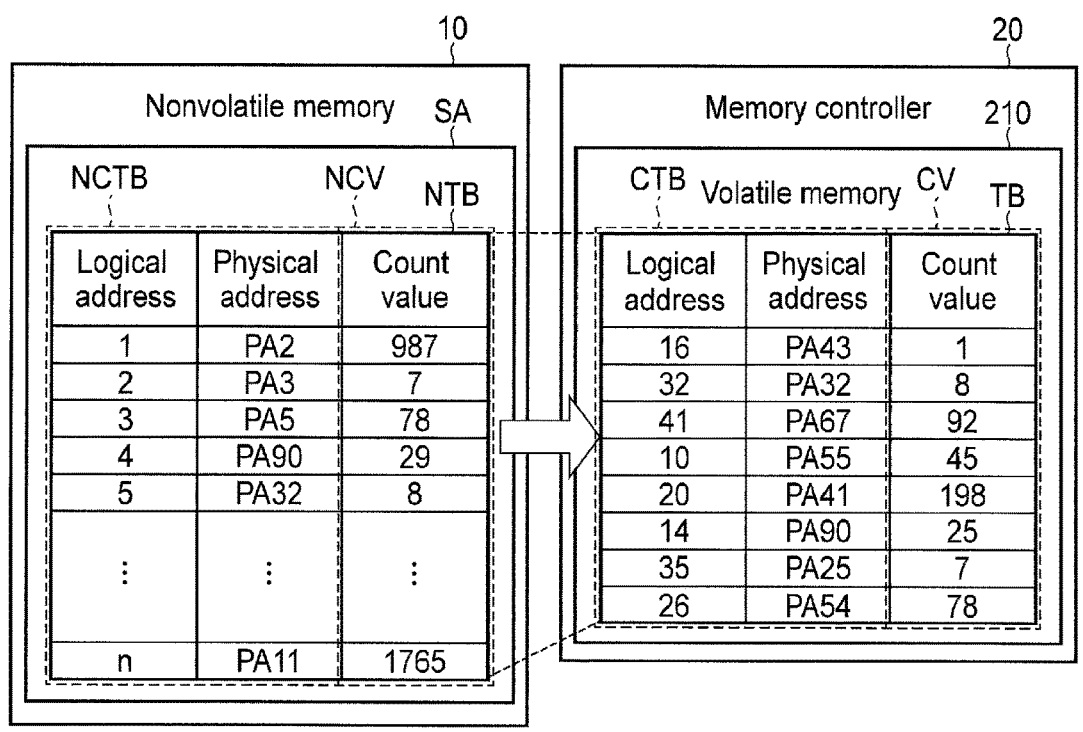
F I G. 2

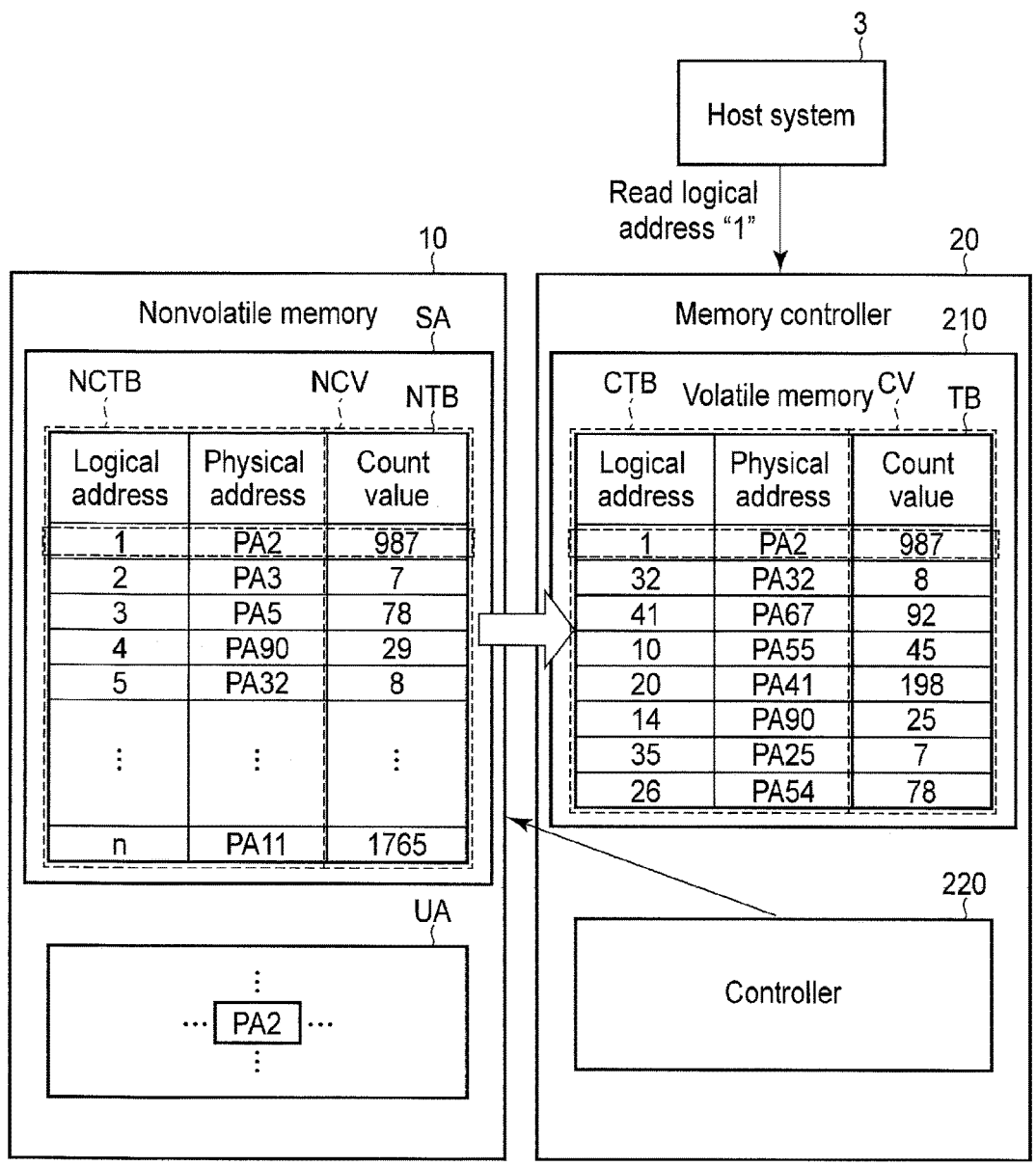
F I G. 3B

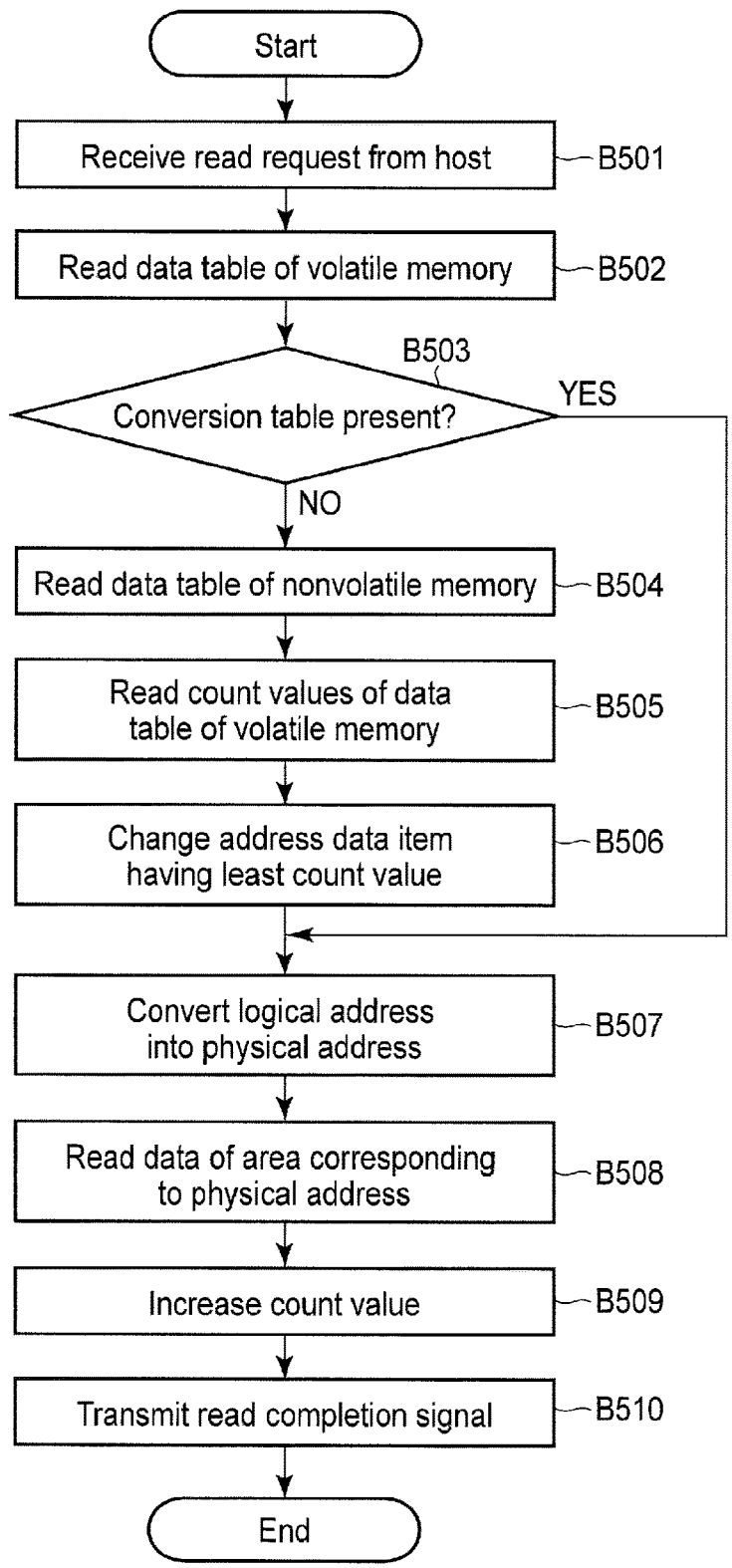
F I G. 5

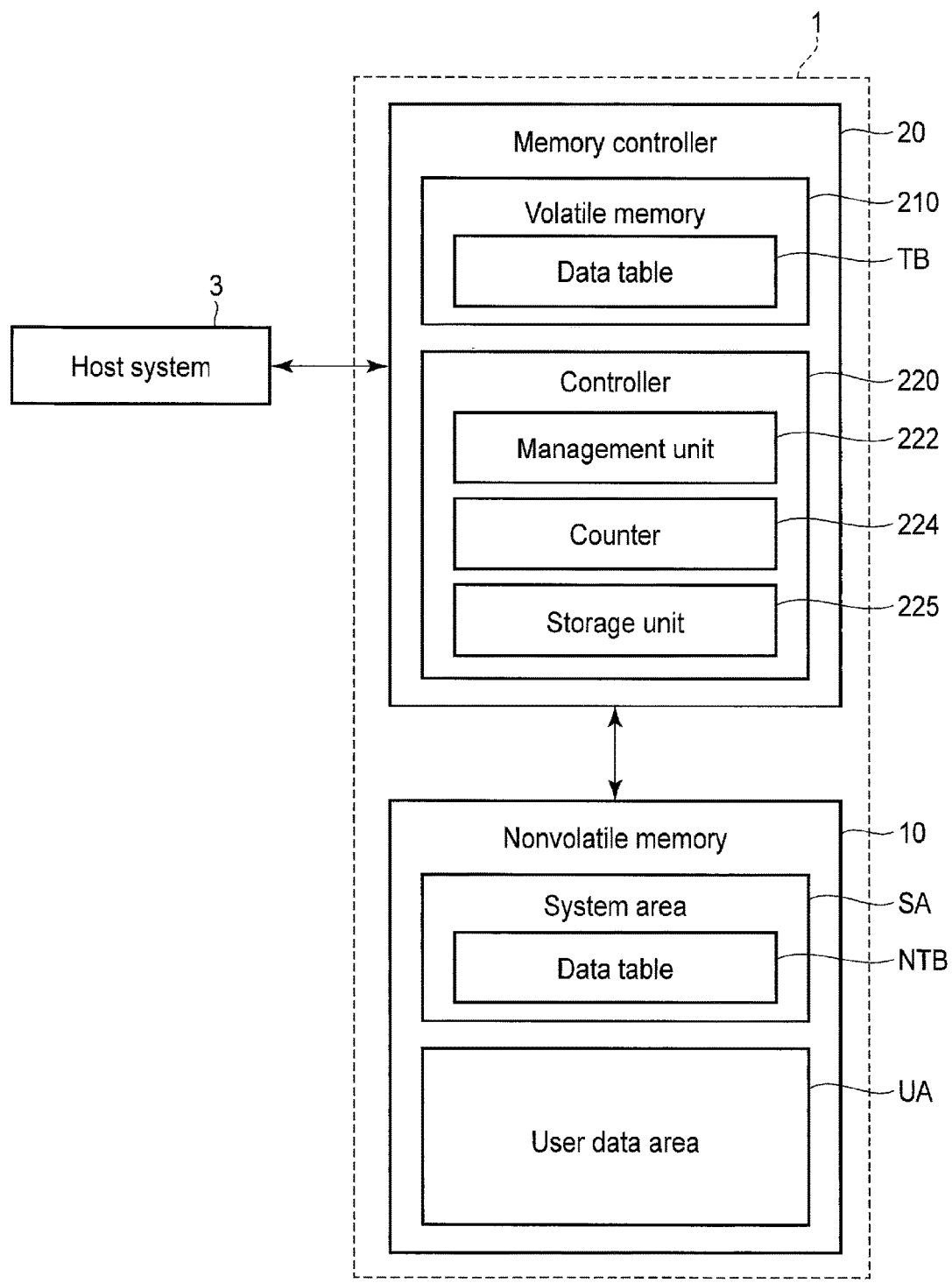
F I G. 6

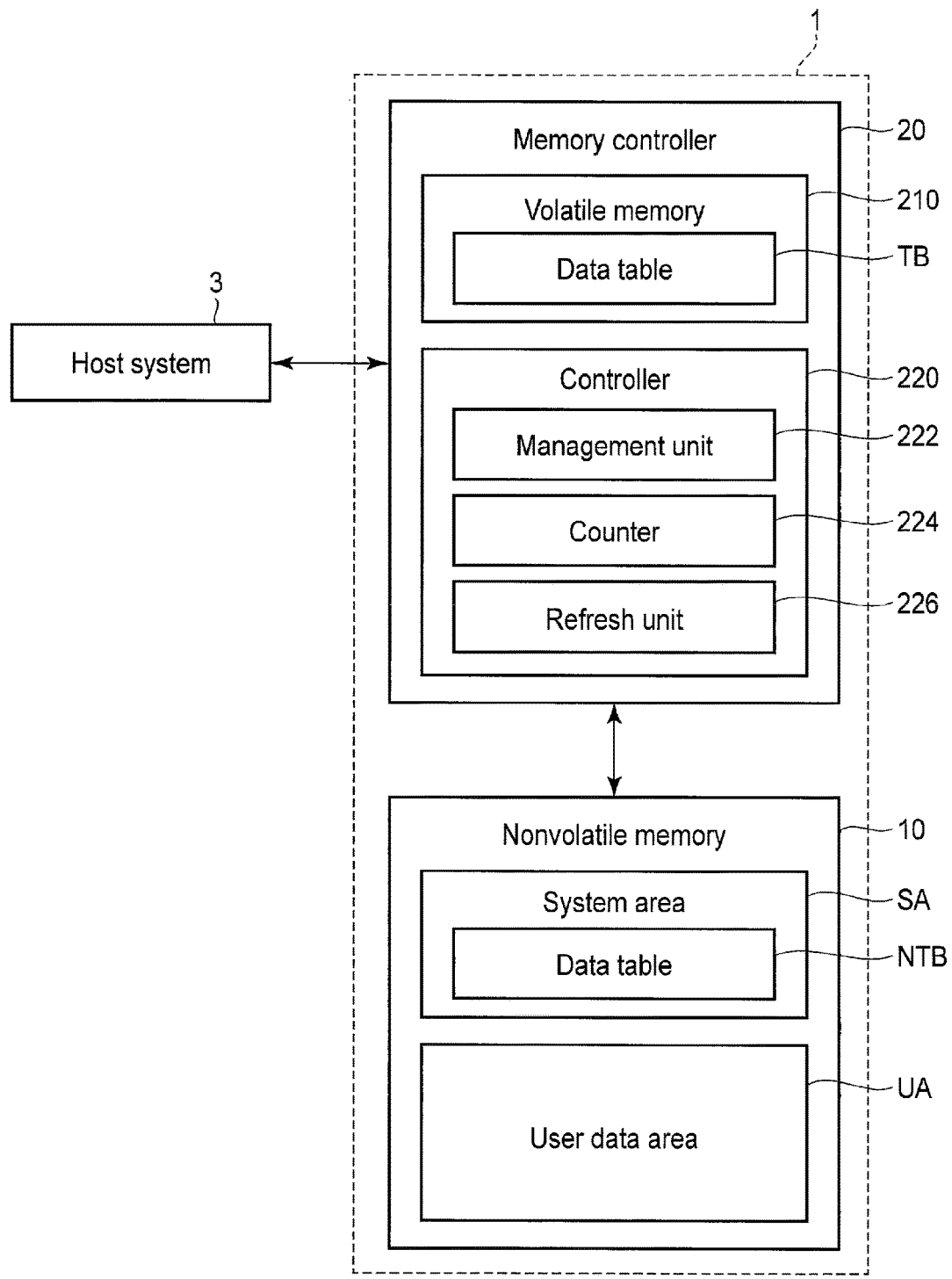
F I G. 8

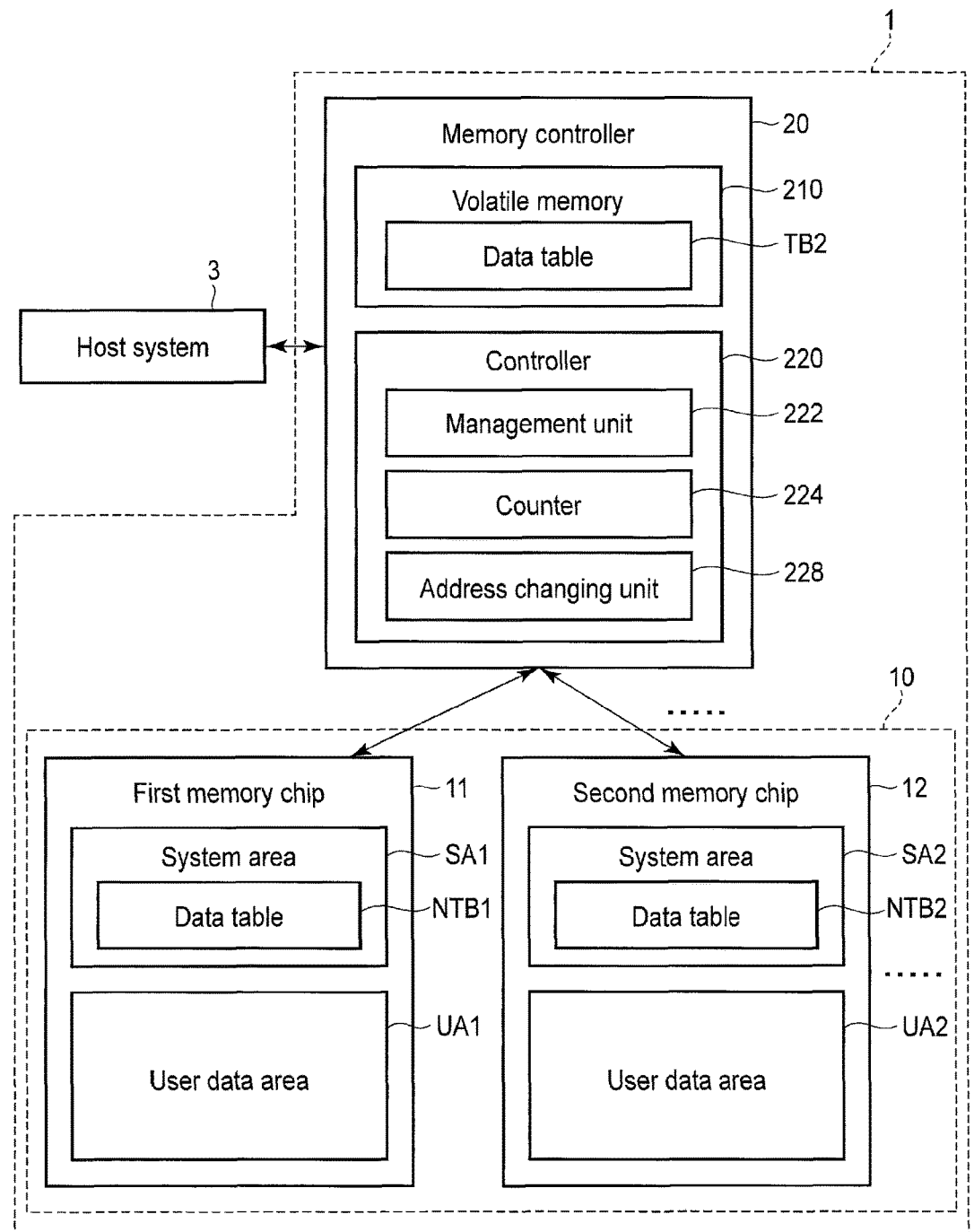
F I G. 10

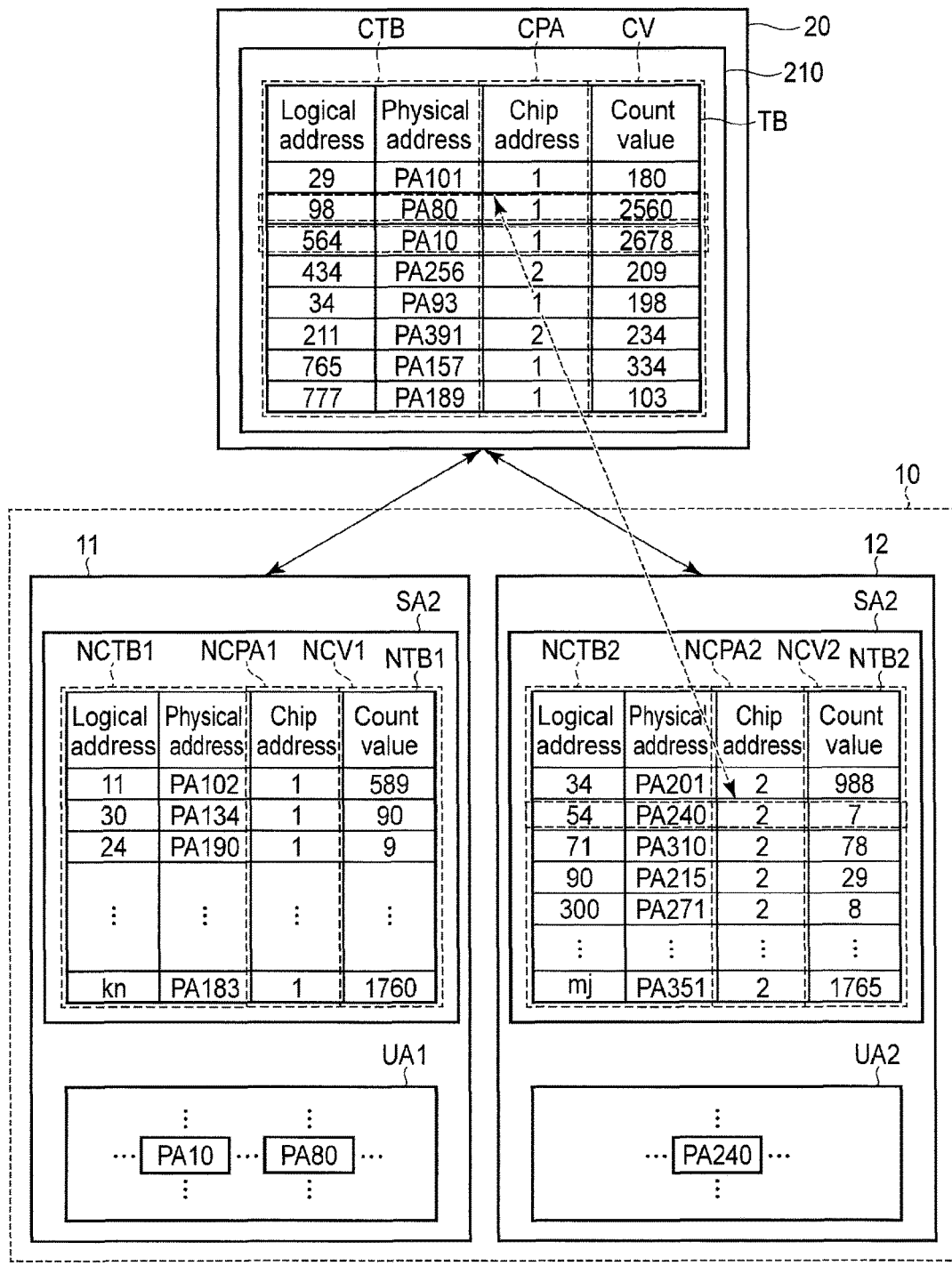
F I G. 11A

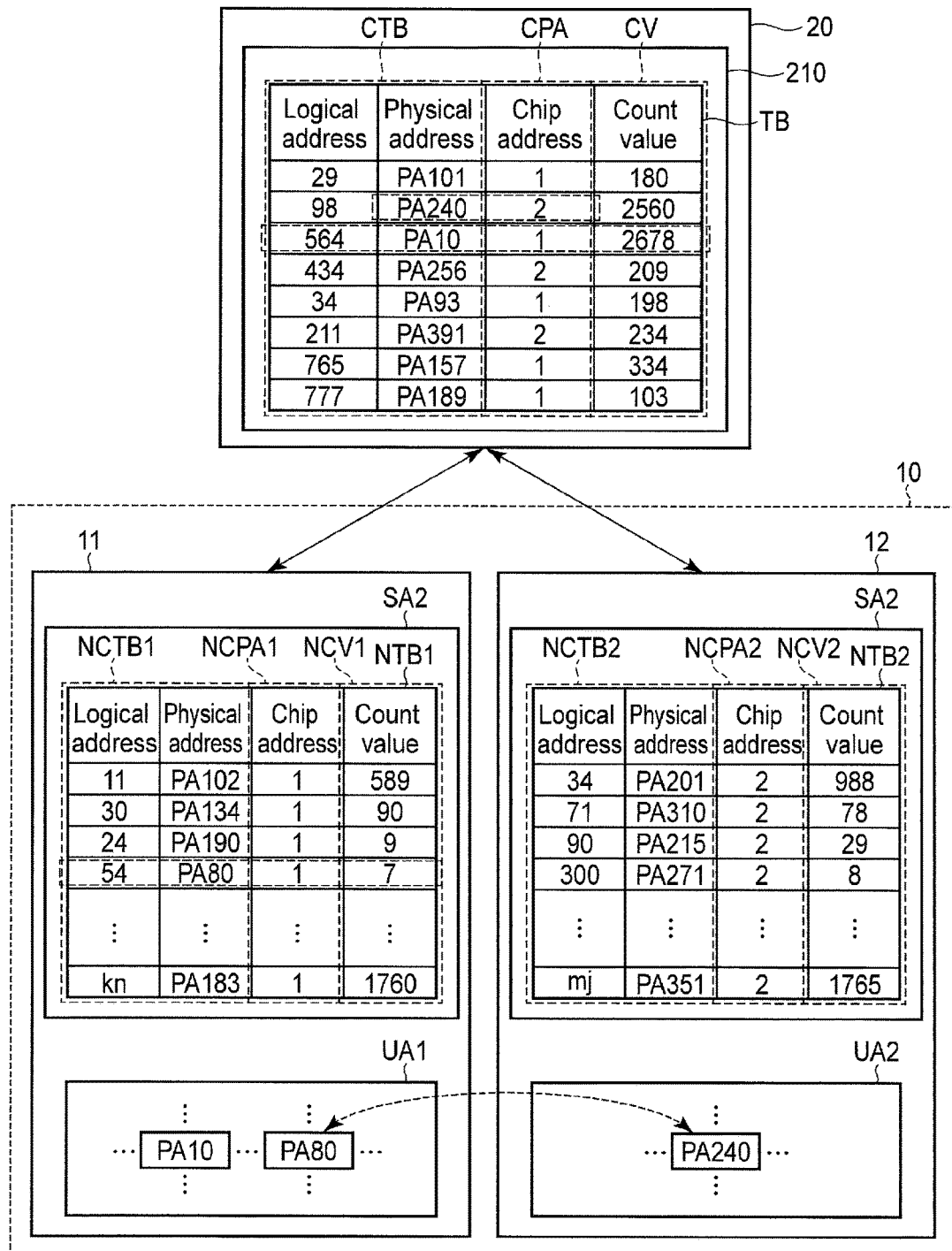
F I G. 11B

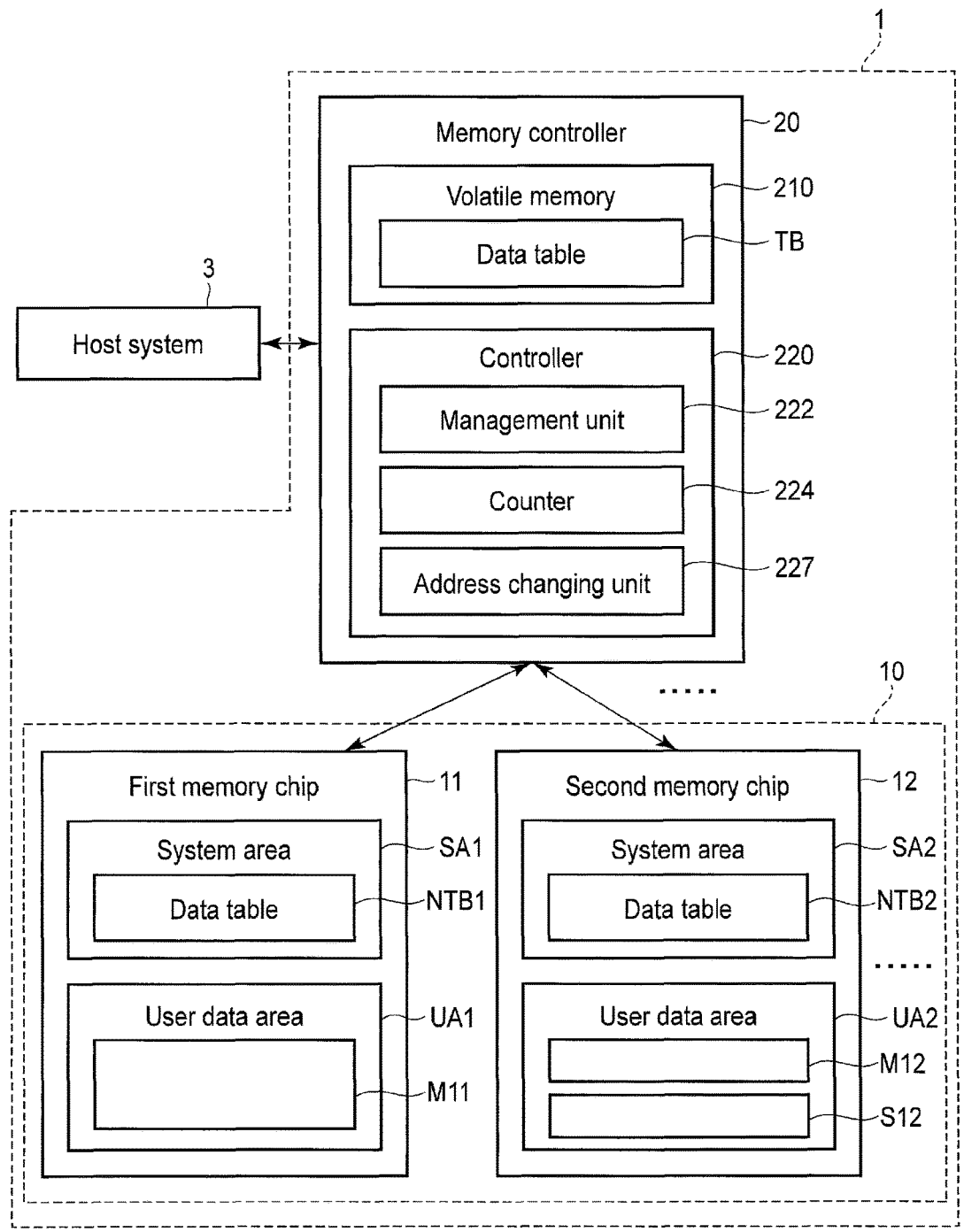
F I G. 12

MEMORY DEVICE AND READ PROCESSING METHOD USING READ COUNTS, FIRST, SECOND, AND THIRD ADDRESSES

CROSS-REFERENCE TO RELATED APPLICATIONS

This application claims the benefit of U.S. Provisional Application No. 62/384,047, filed Sep. 6, 2016, the entire contents of which are incorporated herein by reference.

FIELD

Embodiments described herein relate generally to a memory device and a read processing method.

BACKGROUND

In general, a memory device comprises a nonvolatile memory, and a memory controller comprising a volatile memory. The nonvolatile memory is an electrically erasable and rewritable nonvolatile memory, that is, an Electrically Erasable Programmable Read-Only Memory (EEPROM), for example, a NAND flash memory. The volatile memory is, for example, a Static RAM (SRAM) or a Dynamic RAM (DRAM). The nonvolatile memory reads or writes data page by page and erases data block by block. Thus, the nonvolatile memory requires a long time to randomly access the storage area in comparison with the volatile memory. Therefore, the memory device uses the volatile memory provided in the memory controller as a cache memory. The memory device stores system data including conversion tables between logical addresses and physical addresses (hereinafter, simply referred to as conversion tables) in the system area of the nonvolatile memory. When the power is turned on, the memory device reads part of system data from the nonvolatile memory, and stores the read data in the volatile memory provided in the memory controller. The memory controller converts a logical address accessed from a host into a physical address with reference to the conversion tables of the volatile memory. When a conversion table corresponding to the logical address accessed from the host is not stored in the volatile memory, the memory controller newly reads a conversion table from the nonvolatile memory, and updates and manages the conversion tables of the volatile memory. Thus, when the conversion tables of the volatile memory are updated at each random access from the host, the access performance of the storage device is degraded.

BRIEF DESCRIPTION OF THE DRAWINGS

FIG. 1 is a block diagram showing an example of the configuration of a memory device according to a first embodiment.

FIG. 2 shows a structural example of a data table stored in a nonvolatile memory and a data table stored in a memory controller according to the first embodiment.

FIG. 3B shows the example of the read process performed by the memory device according to the first embodiment.

FIG. 5 is a flowchart showing an example of a read process performed by the memory device according to the first embodiment.

FIG. 6 is a block diagram showing an example of the configuration of the memory device according to a modification example of the first embodiment.

FIG. 8 is a block diagram showing an example of the configuration of a memory device according to a second embodiment.

FIG. 10 is a block diagram showing an example of the configuration of a memory device according to a third embodiment.

FIG. 11A shows an example of a process for changing an address in the memory device according to the third embodiment.

FIG. 11B shows the example of the process for changing the address in the memory device according to the third embodiment.

FIG. 12 is a block diagram showing an example of the configuration of a memory device according to a fourth embodiment.

DETAILED DESCRIPTION

Figure 3A:
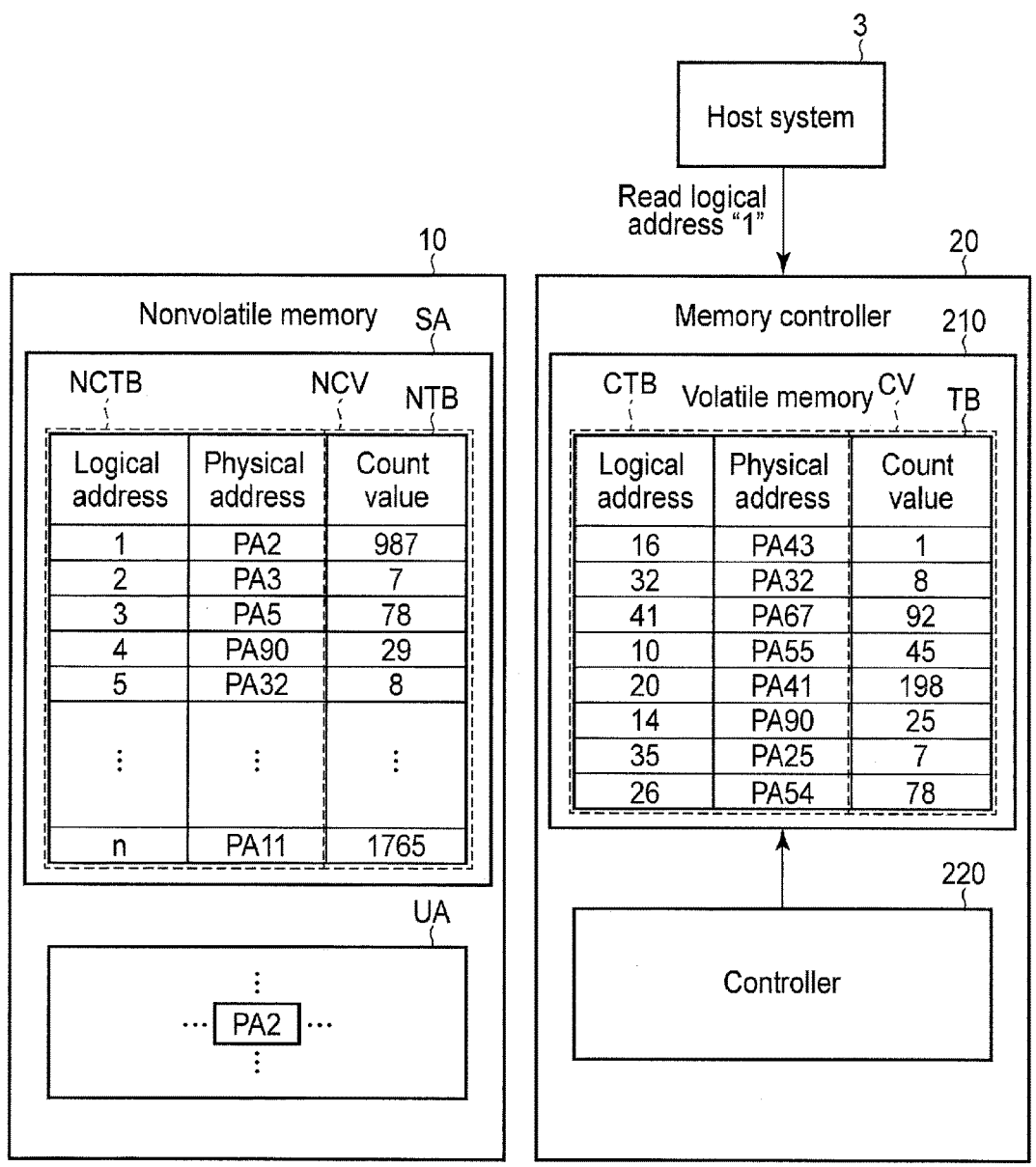
FIG. 3A shows an example of a read process performed by the memory device according to the first embodiment.

In general, according to one embodiment, a memory device comprises a nonvolatile memory; a volatile memory; and a controller which writes a first data table including a first data group comprising a first conversion table including a first logical address corresponding to a first physical address set in a first area of the nonvolatile memory and a first count value as the number of read requests for the first logical address and a second data group comprising a second conversion table including a second logical address corresponding to a second physical address set in a second area of the nonvolatile memory and a second count value as the number of read requests for the second logical address, to the volatile memory, reads the first data table when a third logical address corresponding to a third physical address set in a third area of the nonvolatile memory is requested to be read, compares the first count value and the second count value with each other if the third logical address is not detected in the first data table, and rewrites the first data group or the second data group of the first data table to a third data group comprising a third conversion table including a third logical address and a third count value as the number of read requests for the third logical address based on a result of the comparison.

Embodiments will be described hereinafter with reference to the accompanying drawings.

First Embodiment

FIG. 1 is a block diagram showing an example of the configuration of a memory device 1 according to a first embodiment.

The memory device (nonvolatile storage device) 1 comprises a nonvolatile memory 10 and a memory controller 20. The memory device 1 includes, for example, a memory card such as a flash memory card, and a storage device such as an SSD. The memory device 1 is connected to a host system (hereinafter, simply referred to as a host) 3.

The nonvolatile memory 10 comprises a user data area UA which can be accessed (read/written) from outside, and a system area SA. The nonvolatile memory 10 is, for example, a NAND flash memory. User data is written to the user data area UA. The user data area UA is divided into a plurality of storage areas (hereinafter, referred to as areas) each having a certain data capacity such that a physical address is set in each split area. System data is written to the system data area SA. The system data includes a data table NTB including a physical-logical conversion table (hereinafter, simply referred to as a conversion table) which defines the correspondence between a logical address specified by the host 3 and a physical address, and the number of requests to access a specific logical address from the host 3, etc.

The memory controller 20 controls each interface (I/F) and a memory, for example, the nonvolatile memory 10. In FIG. 1, the memory controller 20 is realized by using a large-scale integrated circuit (LSI) called a system-on-chip (SoC) in which a plurality of elements are integrated in a single chip. The memory controller 20 comprises a volatile memory 210 and a controller 220.

The volatile memory 210 comprises a data table TB. Data table TB includes part of data of data table NTB. The volatile memory 210 is, for example, a Static RAM (SRAM) or a Dynamic RAM (DRAM). The volatile memory 210 may be provided separately from the memory controller 20. In place of the volatile memory 210, a Random Access Memory (RAM) 210 may be provided. The RAM 210 includes a nonvolatile memory such as a Magnetic RAM (MRAM).

The controller 220 includes, for example, a circuit which performs a calculation process such as a microprocessor (MPU), etc. The controller 220 comprises a management unit 222 and a counter 224. The controller 220 performs the processes of various units on firmware.

The management unit 222 manages the access from the host 3 to each memory. For example, the management unit 222 writes data to the nonvolatile memory 10 or reads data from the nonvolatile memory 10 in accordance with a command from the host 3. The management unit 222 updates the data of the nonvolatile memory 10 and the volatile memory 210. For example, when the memory device 1 is turned on, the management unit 222 stores data table TB from the nonvolatile memory 10 in the volatile memory 210. When the memory device 1 is turned off, the management unit 222 stores, in the nonvolatile memory 10, data table TB stored in the volatile memory 210. When a read request is received from the host 3, the management unit 222 determines whether a conversion table corresponding to the logical address of the read request is stored in data table TB of the volatile memory 210. When the management unit 222 detects that a conversion table corresponding to the logical address of the read request is not stored, the management unit 222 reads (obtains) a conversion table corresponding to the logical address of the read request, data related to the conversion table, etc., from data table NTB of the nonvolatile memory 10. Further, the management unit 222 writes the read conversion table, the read data related to the conversion table, etc., to data table TB of the volatile memory 210.

The counter 224 counts the number of read requests from the host 3 to a specific logical address (hereinafter, referred to as a count value). The counter 224 stores the count value in data tables NTB and TB. For example, when the memory device 1 is turned on, the counter 224 starts measuring the count value. The counter 224 measures the count value as an integrated value from when the memory device 1 is turned on at the first time. When the count value has reached the upper limit, the counter 224 may retain the count value while maintaining the upper limit.

FIG. 2 shows a structural example of data table NTB stored in the nonvolatile memory 10 and data table TB stored in the memory controller 20 according to the present embodiment.

Logical addresses and physical addresses corresponding to the logical addresses are stored in data table NTB of the nonvolatile memory 10. Data table NTB includes a conversion table NCTB for converting logical addresses into physical addresses, and a count value NCV corresponding to the logical address of a read request from the host 3. The term "conversion table" is also used to indicate the correspondence relationship between one logical address and a physical address corresponding to the logical address.

Data table TB stored in the volatile memory 210 of the memory controller 20 includes a conversion table CTB for converting logical addresses into physical addresses, and a count value CV corresponding to the logical address of a read request from the host 3. Data table TB comprises the conversion tables and count values obtained from data table NTB. For example, the capacity of data table TB is less than that of data table NTB. In the example shown in the figure, data table TB comprises eight conversion tables, and eight count values corresponding to the eight conversion tables. In the following explanation, a specific conversion table and data corresponding to the specific conversion table such as a count value may be collectively referred to as an address data item (a data group).

Figure 3C:
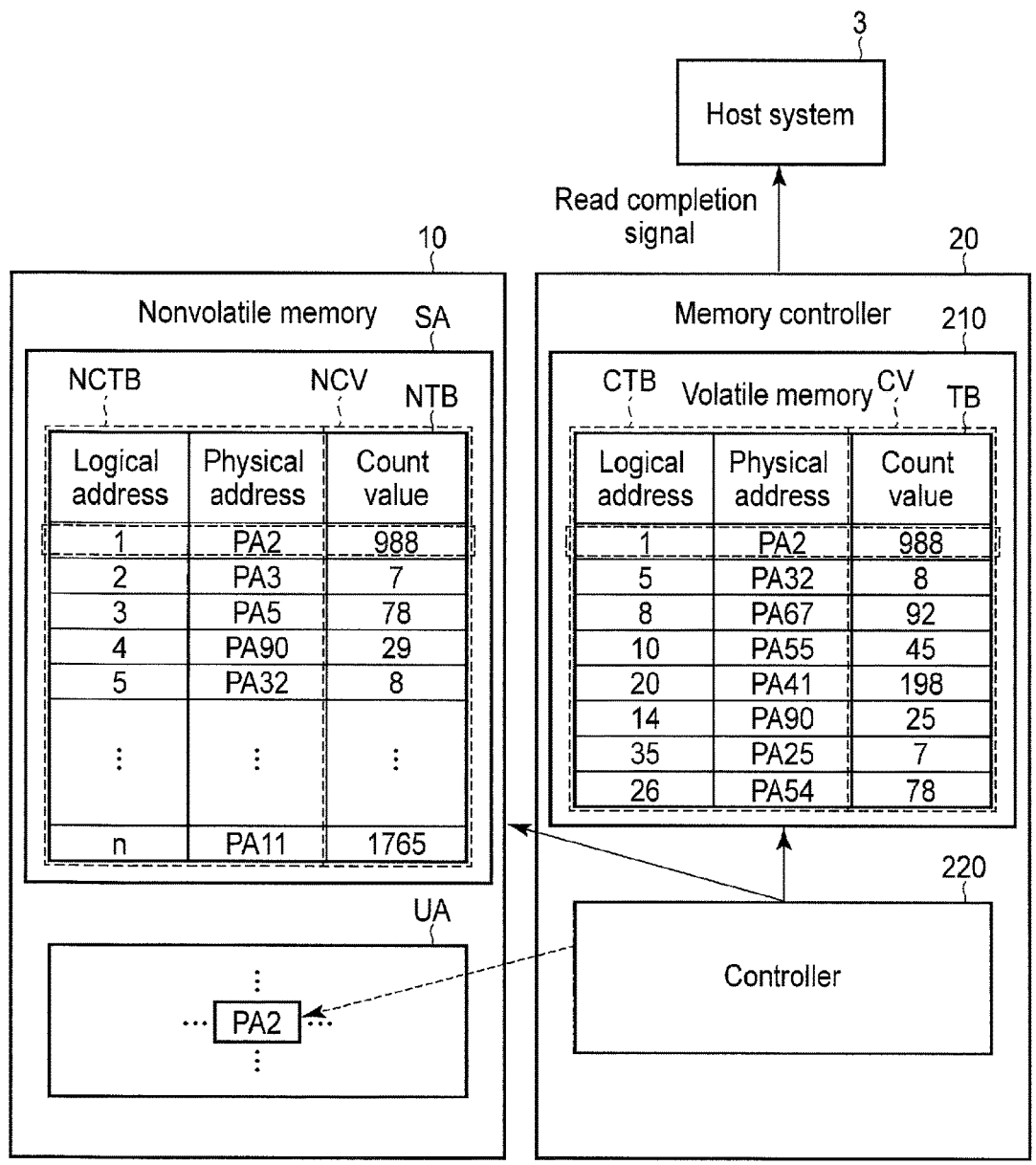
FIG. 3C shows the example of the read process performed by the memory device according to the first embodiment.

FIG. 3A, FIG. 3B and FIG. 3C show an example of a read process performed by the memory device 1 according to the present embodiment. FIG. 3A shows a state in which the memory controller 20 receives a read request from the host 3. FIG. 3B shows a state in which an address data item corresponding to the logical address of a read request from the host 3 is read from data table NTB, and the address data item read from data table NTB is written to data table TB. FIG. 3C shows a state in which the data written to an area of a physical address corresponding to the logical address of the read request from the host 3 is read.

As shown in FIG. 3A, the controller 220 receives a read request for the logical address "1" from the host 3. When the read request is received from the host 3, the controller 220 reads data table TB. The controller 220 determines whether a conversion table corresponding to the logical address "1" of the read request from the host 3 is stored in data table TB of the volatile memory 210. In the example shown in the figure, the controller 220 determines that a conversion table corresponding to the logical address "1" is not stored in data table TB.

Subsequently, as shown in FIG. 3B, the controller 220 reads an address data item corresponding to the logical address "1" from data table NTB. The controller 220 reads the count values of the address data items stored in data table TB, and detects the address data item having the least count value in data table TB (specifically, the address data item of the logical address "16"). The controller 220 changes (overwrites) the address data item having the least count value of the eight address data items stored in data table TB to (with) the address data item corresponding to the logical address "1". The controller 220 reads the conversion table of data table NTB, and temporarily stores, in a buffer, etc., the address data item corresponding to the logical address "1" of the read request. The controller 220 temporarily stores, in the buffer, etc., the address data item having the least count value of the eight address data items stored in data table TB (specifically, the address data item corresponding to the logical address "16"), erases this address data item from data table TB, and writes the address data item corresponding to the logical address "1" of the read request and temporarily stored in the buffer, etc., to data table TB. The controller 220 converts the logical address "1" of the read request into the physical address "PA2" with reference to the conversion table of data table TB.

Subsequently, as shown in FIG. 3C, the controller 220 reads the data written to the area of the physical address "PA2" of the user data area UA of the nonvolatile memory 10. After this reading process is completed, the controller 220 outputs a read completion signal to the host 3. In data tables TB and NTB, the controller 220 updates the count value "987" of the address data item corresponding to the logical address "1" of the read request by, for example, adding 1 (by an increment of 1), such that the count value is changed to 988.

Figure 4A:
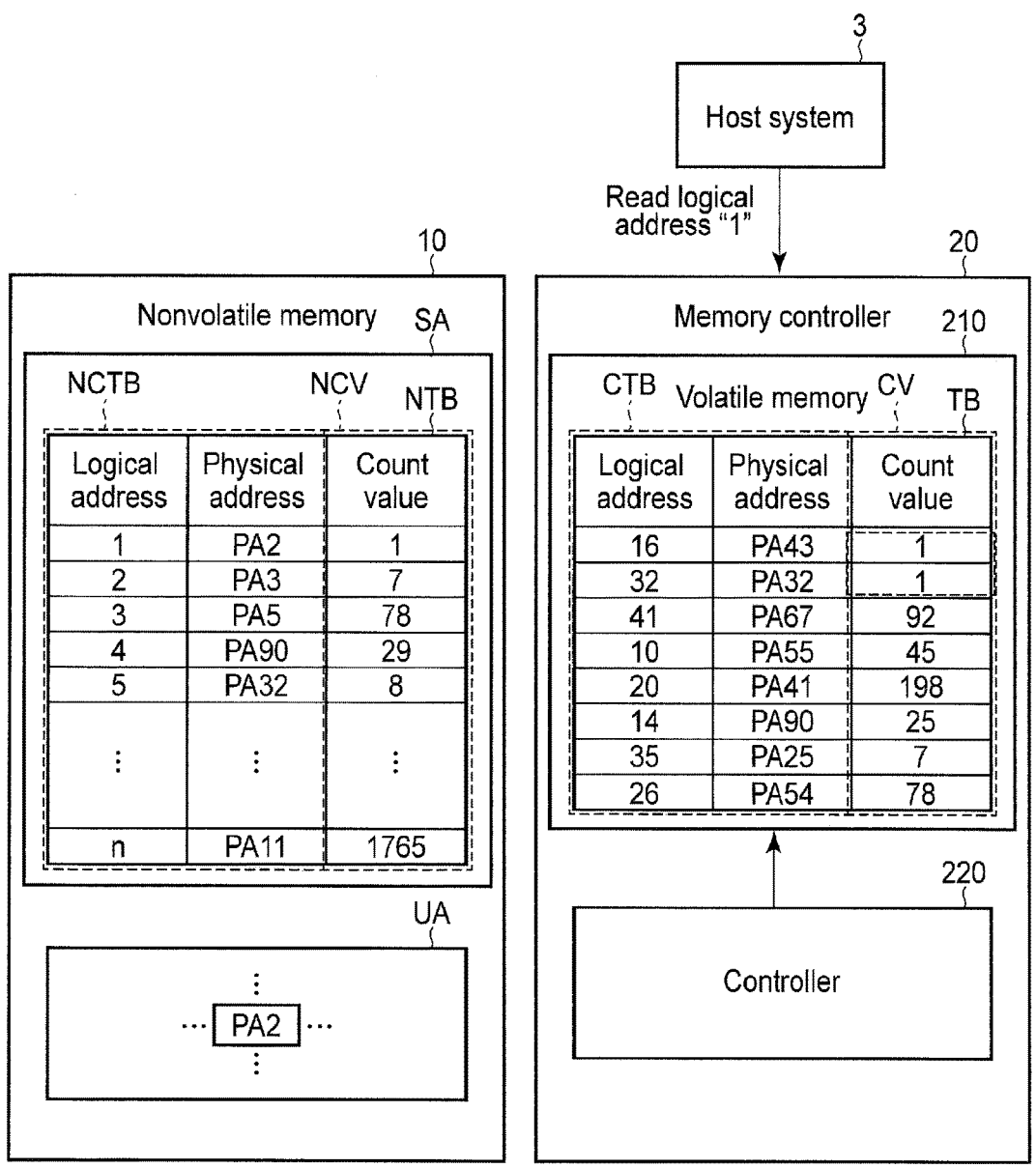
FIG. 4A shows an example of a read process performed by the memory device according to the first embodiment.
Figure 4B:
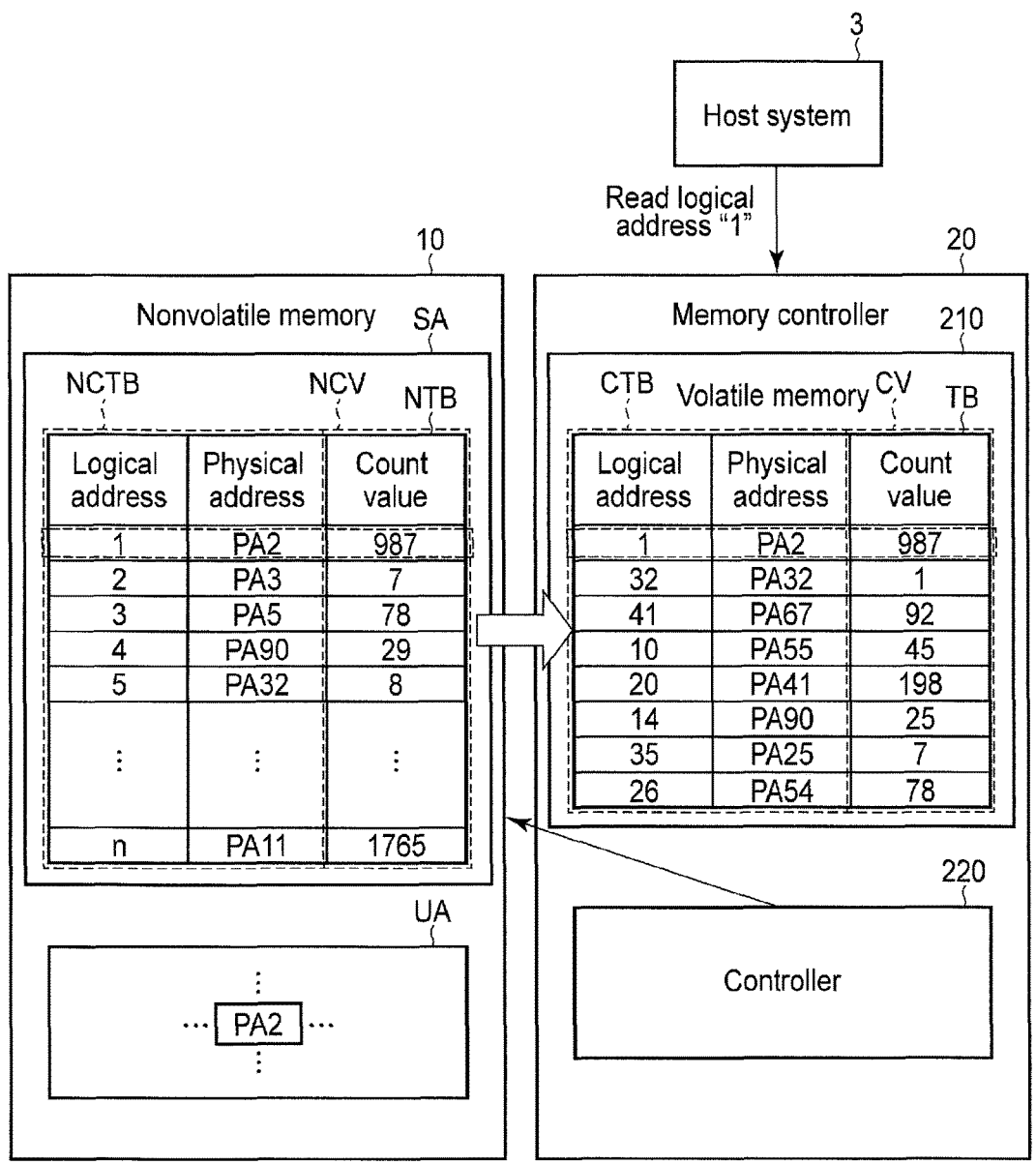
FIG. 4B shows the example of the read process performed by the memory device according to the first embodiment.

FIG. 4A and FIG. 4B show an example of a read process performed by the memory device 1 according to the present embodiment. FIG. 4A shows a state in which the count values of two address data items are the same in data table TB when the memory controller 20 receives a read request from the host 3. FIG. 4B shows a state in which an address data item corresponding to the logical address of the read request from the host 3 is read from data table NTB, and the read address data item is written to data table TB.

As shown in FIG. 4A, when the controller 220 determines that a conversion table corresponding to the logical address "1" of a read request from the host 3 is not stored in data table TB, the controller 220 detects two address data items having the least count value of the eight address data items stored in data table TB of the volatile memory 210 (specifically, two address data items corresponding to the logical addresses "16" and "32").

As shown in FIG. 4B, in data table TB, the controller 220 changes an address data item corresponding to the logical address "16", which is less than the logical address of the other one of the two address data items having the least count value, to an address data item corresponding to the logical address "1" of the read request.

For example, when a plurality of address data items are detected as the address data items having the least count value of the address data items stored in data table TB, the controller 220 replaces the address data item having the least logical address of the address data items having the least count value in data table TB. As another example, in this case, the controller 220 may replace the oldest address data item of the address data items having the least count value in data table TB.

FIG. 5 is a flowchart showing an example of a read process performed by the memory device 1 according to the present embodiment.

The controller 220 receives a read request for data corresponding to a logical address from the host 3 (B501). When the read request is received from the host 3, the controller 220 reads data table TB (B502). The controller 220 determines whether a conversion table corresponding to the logical address of the read request from the host 3 is stored in data table TB (B503).

When the controller 220 determines that a conversion table corresponding to the logical address of the read request is not stored in data table TB (NO in B503), the controller 220 reads an address data item corresponding to the logical address of the read request from data table NTB (B504). The controller 220 reads the count values stored in data table TB of the volatile memory 210, and detects the address data item having the least count value (B505). The controller 220 changes the address data item having the least count value of the address data items stored in data table TB to the address data item corresponding to the logical address of the read request (8506).

When the controller 220 determines that a conversion table corresponding to the logical address of the read request is stored in data table TB (YES in B503), the controller 220 converts the logical address of the read request from the host 3 into a physical address with reference to the conversion table corresponding to the logical address of the read request and stored in data table TB (B507).

The controller 220 reads the data written to an area of the physical address corresponding to the logical address of the read request from the host 3 (B508). In data tables TB and NTB, the controller 220 adds a constant count number, for example, 1, to the count value of the address data item corresponding to the logical address of the read request from the host 3 (B509). The controller 220 outputs a read completion signal to the host 3 (B510).

In the present embodiment, when the memory device 1 determines that a conversion table corresponding to the logical address of a read request is not stored in data table TB, the memory device 1 changes the address data item having the least count value of the address data items stored in data table TB to an address data item corresponding to the logical address of the read request from the host 3 and stored in data table NTB. Thus, the memory device 1 is allowed to collect, in data table TB, address data items having great count values, in other words, address data items corresponding to logical addresses having many read requests from the host 3, and optimize data table TB. The memory device 1 is allowed to reduce the number of reads (updates) of address data items corresponding to the logical addresses of read requests from the host 3 from data table NTB of the nonvolatile memory 10 when the memory device 1 receives the read requests from the host 3. As a result, the memory device 1 is allowed to improve the access performance, for example, the read speed.

Now, this specification explains memory devices according to a modification example and other embodiments. In the modification example and embodiments explained below, the same structural elements as the first embodiment are denoted by like reference numbers, detailed description thereof being omitted or simplified. Structural elements different from those of the first embodiment are mainly explained in detail.

Modification Example

FIG. 6 is a block diagram showing an example of the configuration of the memory device 1 according to a modification example of the first embodiment. The memory device 1 of the modification example stores some logical addresses corresponding to less count values among the logical addresses of the address data items stored in data table TB. In this respect, the memory device 1 of the modification example is different from the memory device 1 of the first embodiment.

In the memory device 1 of a modification example, the controller 220 comprises a storage unit 225. The storage unit 225 stores at least two logical addresses in order from the logical address having the least count value of the logical addresses stored in data table TB. For example, the storage unit 225 reads the count values of the address data items stored in data table TB. Based on the read result, the storage unit 225 stores the logical address corresponding to the least count value of the logical addresses of the address data items stored in data table TB, and the logical address corresponding to the second least count value. The storage unit 225 preferably stores eight logical addresses in order from the logical address corresponding to the least count value of the logical addresses of the address data items stored in data table TB to the logical address corresponding to the eighth least count value.

Figure 7A:
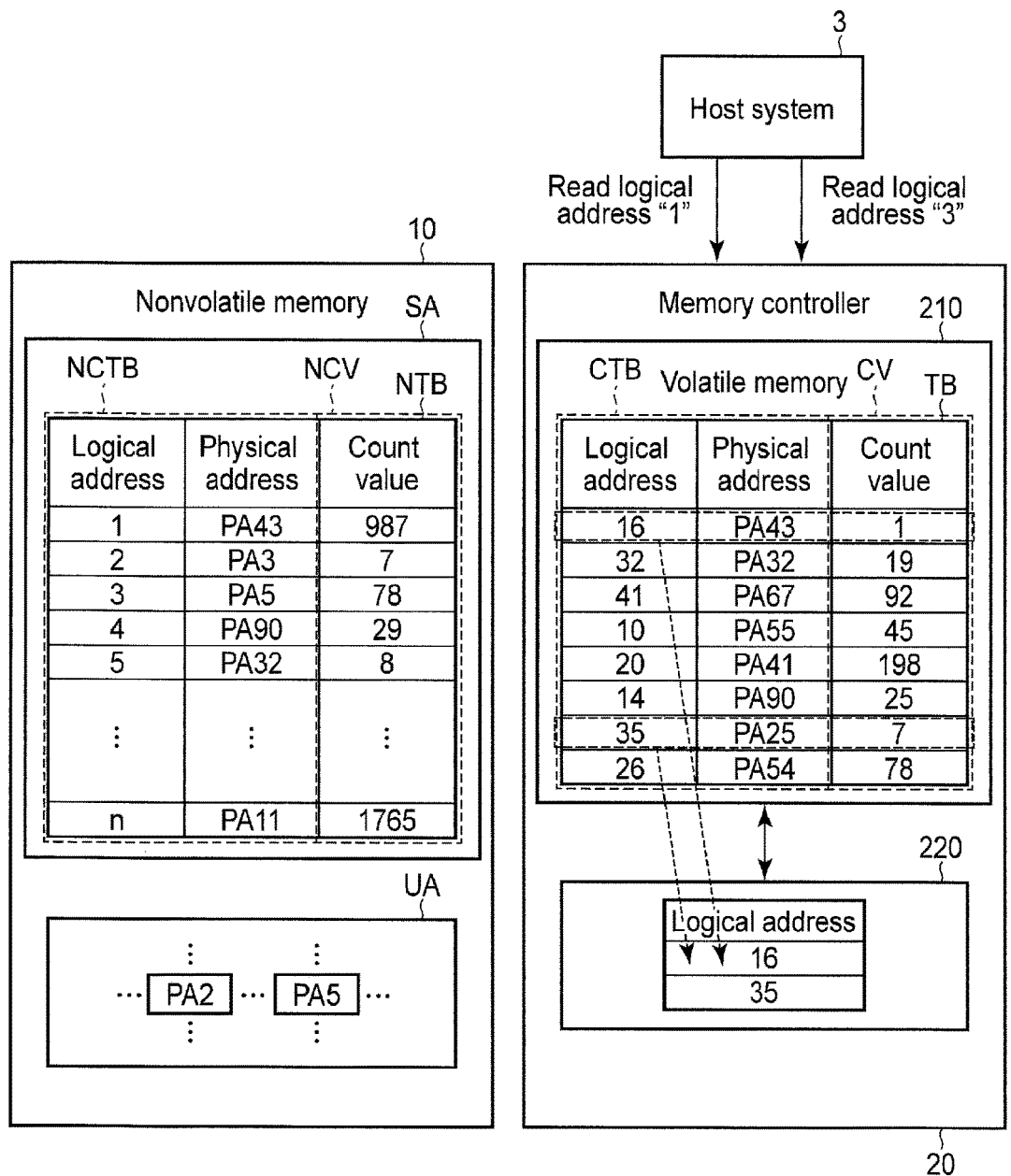
FIG. 7A shows an example of a read process performed by the memory device according to the modification example.
Figure 7B:
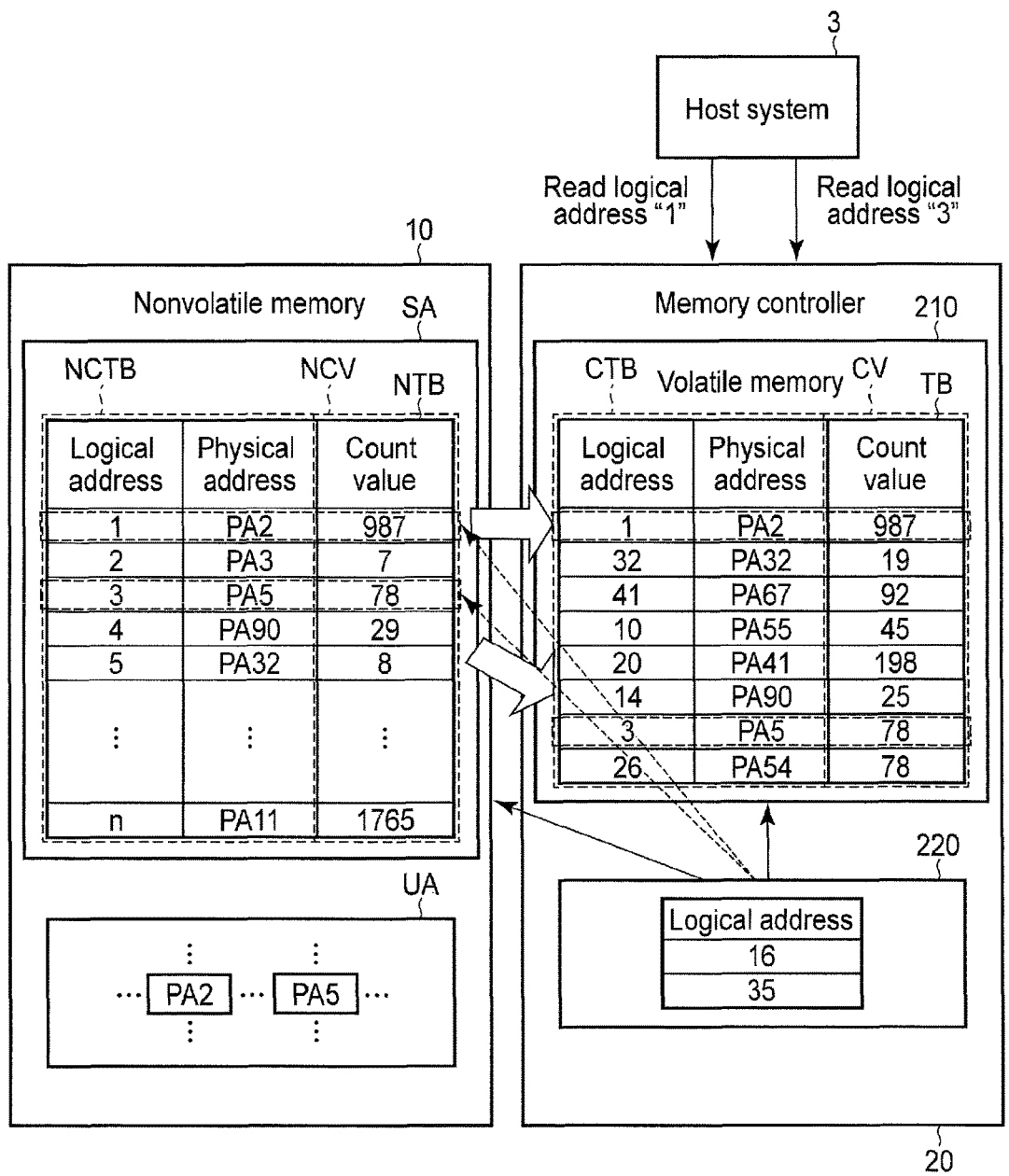
FIG. 7B shows the example of the read process performed by the memory device according to the modification example.
Figure 7C:
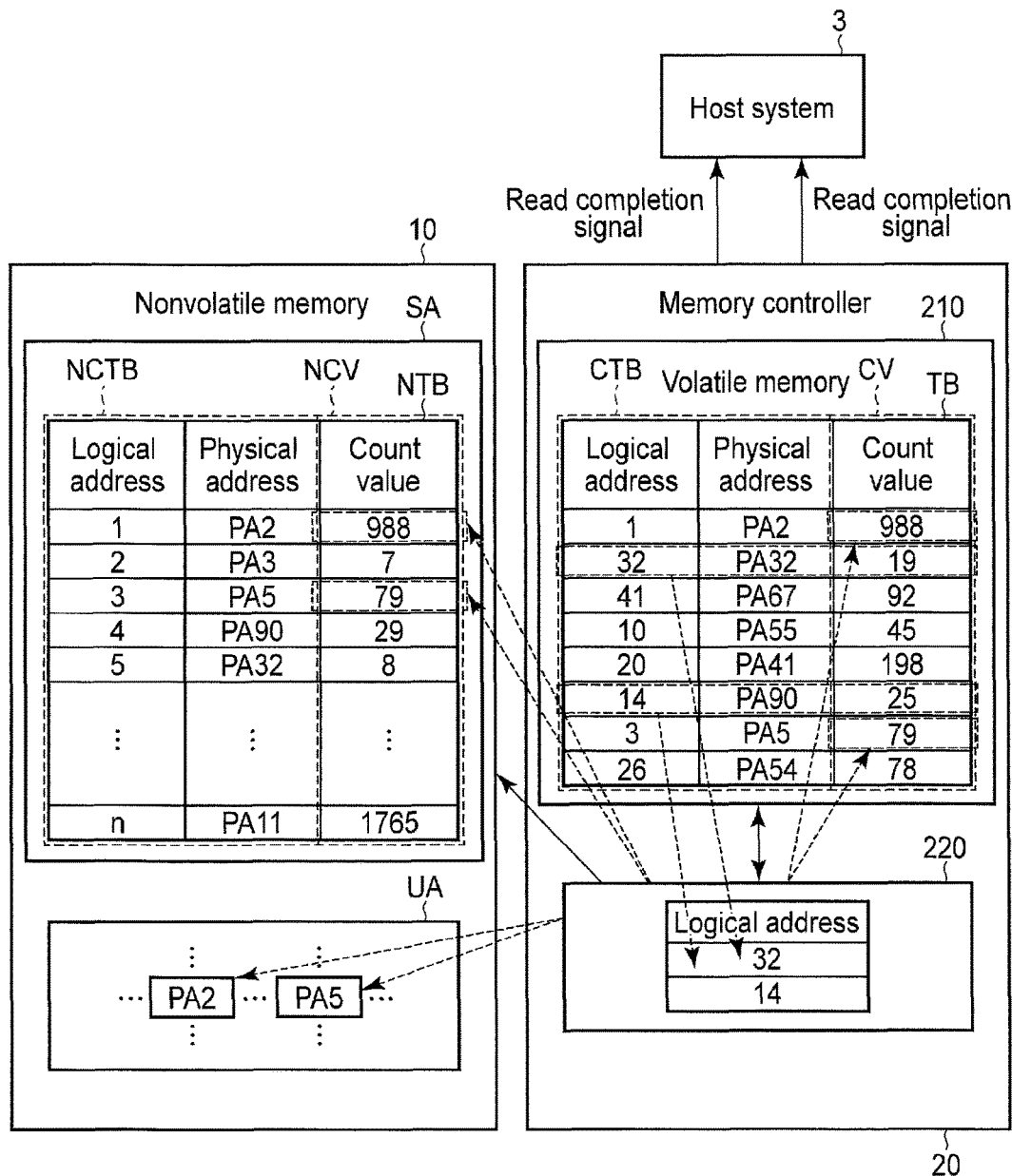
FIG. 7C shows the example of the read process performed by the memory device according to the modification example.

FIG. 7A, FIG. 7B and FIG. 7C show an example of a read process performed by the memory device 1 according to the modification example. FIG. 7A shows a state in which the memory controller 20 receives a plurality of read requests from the host 3 substantially at the same time. FIG. 7B shows a state in which the logical addresses of the read requests from the host 3 are read from data table NTB, and the address data items read from data table NIB are written to data table TB. FIG. 7C shows a state in which the data written to areas of physical addresses corresponding to the logical addresses of the read requests from the host 3 is read.

As shown in FIG. 7A, the controller 220 stores the logical address "16" corresponding to the least count value, and the logical address "35" corresponding to the second least count value. The controller 220 receives read requests for the logical addresses "1" and "3" from the host 3. When the controller 220 receives the read requests from the host 3, the controller 220 reads data table TB. The controller 220 determines whether conversion tables corresponding to the logical addresses "1" and "3" of the read requests from the host 3 are stored in data table TB of the volatile memory 210. In the example shown in the figure, the controller 220 determines that conversion tables corresponding to the logical addresses "1" and "3" are not stored in data table TB.

Subsequently, as shown in FIG. 7B, the controller 220 reads two address data items corresponding to the logical addresses "1" and "3" from data table NTB. The controller 220 changes two address data items corresponding to the logical address "16" corresponding to the least count value of the eight address data items stored in data table TB and the logical address "35" corresponding to the second least count value to the two address data items corresponding to the logical addresses "1" and "3". The controller 220 refers to data table TB, converts the logical address "1" of the read request into the physical address "PA2", and converts the logical address "3" of the read request into the physical address "PA5".

Subsequently, as shown in FIG. 7C, the controller 220 reads the data written to the area of the physical address "PA2" of the user data area UA of the nonvolatile memory 10, and the data written to the area of the physical address "PA5" of the user data area UA of the nonvolatile memory 10. After this reading process is completed, the controller 220 outputs read completion signals to the host 3. In data tables TB and NTB, for example, the controller 220 adds 1 to the count value "987" of the address data item corresponding to the logical address "1" of the read request such that the count value "987" is changed to the count value "988". In data table TB, for example, the controller 220 adds 1 to the count value "79" of the address data item corresponding to the logical address "3" of the read request such that the count value "79" is changed to the count value "79".

After the read process is completed, the controller 220 reads the count values of the address data items stored in data table TB, and newly stores the logical address "32" corresponding to the least count value and the logical address "24" corresponding to the second least count value.

In the modification example, the controller 220 stores at least two logical addresses in order from the logical address corresponding to the least count value of the address data items stored in data table TB of the volatile memory 210. With this structure, in data table TB, the controller 220 is allowed to always recognize whether the logical address corresponding to the least count value has been changed. When the memory device 1 receives a read request from the host 3, the memory device 1 does not need to detect the logical address corresponding to the least count value from data table TB. Thus, the memory device 1 is capable of performing a read process without degrading the access performance. Even when the memory device 1 receives a plurality of read requests from the host 3, the memory device 1 is capable of performing a read process without degrading the access performance. Thus, the access performance of this memory device 1 is improved in comparison with the memory device 1 of the embodiment explained earlier.

The controller 220 may be configured to store at least two address data items in order from the address data item corresponding to the least count value of the address data items stored in data table TB of the volatile memory 210 when there is no access request from the host 3.

Second Embodiment

FIG. 8 is a block diagram showing an example of the configuration of a memory device 1 according to a second embodiment. The memory device 1 of the second embodiment reads the data written to a specific area of a nonvolatile memory 10, and performs a rewrite process (hereinafter, referred to as a refresh process) for the read data. In this respect, the memory device 1 of the second embodiment is different from the memory device of the embodiment explained earlier.

In the memory device 1 of the present embodiment, a controller 220 comprises a refresh unit 226. The refresh unit 226 holds a threshold for the count value for performing a refresh process, and compares the threshold with the count values of the address data items stored in a data table TB of a volatile memory 210. For example, the refresh unit 226 performs this comparison process when there is no access request from a host 3. When a count value greater than the threshold is detected as a result of comparison, the refresh unit 226 detects a logical address corresponding to the count value greater than the threshold. The refresh unit 226 detects a physical address corresponding to the logical address with reference to the conversion table of data table TB. The refresh unit 226 confirms the data written to an area corresponding to the physical address. When the refresh unit 226 determines that a refresh process needs to be performed for the data written to the area, the refresh unit 226 performs a refresh process for the data of the area.

Figure 9:
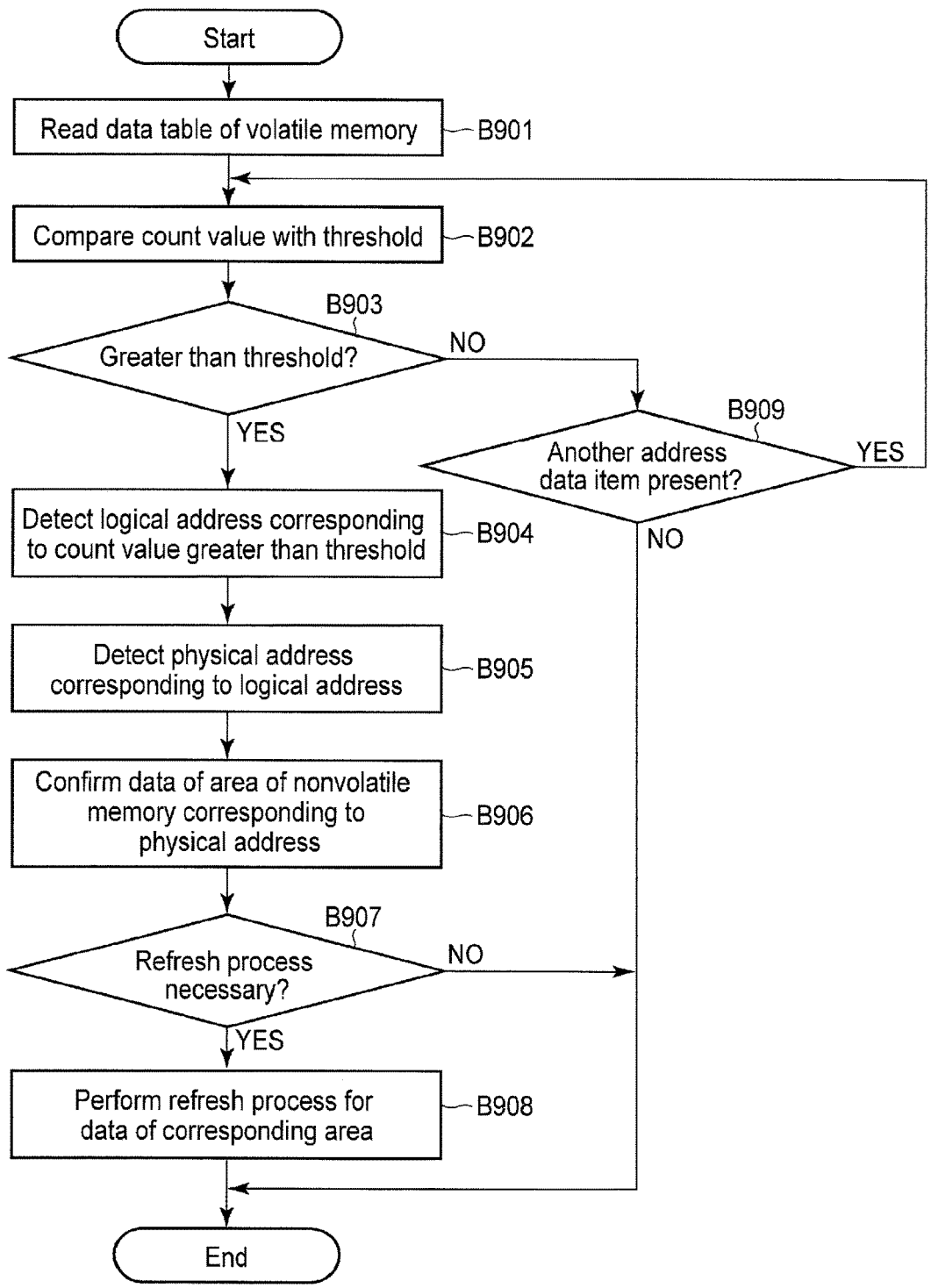
FIG. 9 is a flowchart showing an example of a refresh process performed by the memory device according to the second embodiment.

FIG. 9 is a flowchart showing an example of a refresh process performed by the memory device 1 according to the present embodiment.

The controller 220 reads data table TB of the volatile memory 210 when there is no access request from the host (B901). The controller 220 compares the count value of a specific address data item of the address data items stored in data table TB of the volatile memory 210 with a threshold set in advance (B902).

In data table TB, the controller 220 determines whether the count value of the specific address data item is greater than the threshold set in advance (B903). When the controller 220 determines that the count value of the specific address data item is greater than the threshold (YES in B903), the controller 220 detects a logical address corresponding to the count value (B904). The controller 220 detects a physical address corresponding to the logical address with reference to the conversion table of data table TB (B905). The controller 220 confirms the data written to an area corresponding to the physical address of the nonvolatile memory 10 (B906). The controller 220 determines whether a refresh process needs to be performed for the data written to the area (B907). When the controller 220 determines that a refresh process needs to be performed for the data written to the area (YES in B907), the controller 220 performs a refresh process to the data written to the area (B908). When the controller 220 determines that a refresh process does not need to be performed for the data written to the area (NO in B907), the controller 220 terminates the process.

When the controller 220 determines that the count value of the specific address data item is less than the threshold (NO in B903), the controller 220 determines whether another address data item is present in data table TB (B909). When the controller 220 determines that another address data item is present in data table TB (YES in B909), the controller 220 proceeds to the process of step B901. When the controller 220 determines that another address data item is not present in data table TB (NO in B909), the controller 220 terminates the process.

In the present embodiment, the memory device 1 is allowed to confirm the data written to the area of the physical address of the address data item of a count value greater than a threshold, and perform a refresh process for the data written to the area based on the necessity. Thus, it is possible to improve the reliability of the data written to the nonvolatile memory 10 in comparison with the memory device 1 of the embodiment explained earlier.

Third Embodiment

FIG. 10 is a block diagram showing an example of the configuration of a memory device 1 according to a third embodiment. The memory device 1 of the third embodiment changes a physical address corresponding to the logical address of an address data item having a great count value among the address data items stored in a data table TB to a physical address corresponding to another storage medium. In this respect, the memory device 1 of the third embodiment is different from the memory device of each of the embodiments explained earlier.

In the memory device 1 of the present embodiment, a nonvolatile memory 10 comprises a plurality of storage media (hereinafter, referred to as memory chips). For example, the nonvolatile memory 10 comprises a first memory chip 11 and a second memory chip 12. The first memory chip 11 comprises a system area SA1 comprising a data table NTB1, and a user data area UA1. The second memory chip 12 comprises a system area SA2 comprising a data table NTB2, and a user data area UA2.

A controller 220 comprises an address changing unit 227. The address changing unit 227 holds a threshold for the count value for changing the correspondence relationship between logical addresses and physical addresses in the conversion table. The address changing unit 227 compares the threshold with the count values of the address data items stored in data table TB of a volatile memory 210. For example, the address changing unit 227 performs this comparison process when there is no access request from a host 3. When a plurality of count values greater than the threshold are detected as a result of comparison, the address changing unit 227 detects a plurality of logical addresses corresponding to the count values greater than the threshold. The address changing unit 227 refers to the conversion table of data table TB, and detects physical addresses corresponding to the logical addresses, and memory chips corresponding to the physical addresses. When the address changing unit 227 detects that the physical addresses corresponding to the logical addresses correspond to the same memory chip, the address changing unit 227 changes the physical addresses corresponding to the logical addresses to physical addresses corresponding to different memory chips.

FIG. 11A and FIG. 11B show an example of a process for changing an address in the memory device 1 according to the third embodiment. FIG. 11A shows a state in which the physical addresses of two address data items having count values greater than a threshold correspond to the same first memory chip 11. FIG. 11B shows a state in which one of the physical addresses of the two address data items having the count values greater than the threshold is changed to a physical address corresponding to the second memory chip 12. In FIG. 11A and FIG. 11B, chip addresses CPA, NCPA1 and NCPA2 indicate memory chips corresponding to physical addresses. In chip addresses CPA, NCPA1 and NCPA2, the chip address "1" indicates that the physical address corresponds to the first memory chip 11. The chip address "2" indicates that the physical address corresponds to the second memory chip 12. It is assumed that an address data item corresponding to the logical address "98" is the oldest address data item in the volatile memory 210, specifically, the address data item firstly stored in data table TB among the eight address data items stored in data table TB.

As shown in FIG. 11A, the controller 220 reads data table TB of the volatile memory 210 when there is no access request from the host 3. The controller 220 compares the threshold for the count value for changing the correspondence relationship between logical addresses and physical addressed in the conversion table, for example, the count value "2500", with the count values of the eight address data items stored in data table TB. When the count values "2560" and "2678" greater than the threshold are detected as a result of comparison, the controller 220 detects the logical address "98" of the address data item of the count value "2560" and the logical address "564" of the address data item of the count value "2678" in the data table. The controller 220 refers to data table TB, and detects the physical address "PA80" and the chip address "1" corresponding to the logical address "98", and the physical address "PA10" and the chip address "1" corresponding to the logical address "564". In the example shown in the figure, the controller 220 detects that the chip address "1" of the physical address "PA80" is the same as the chip address "1" of the physical address "PA10".

For example, the controller 220 changes the physical address "PA80" corresponding to the logical address "98" less than the logical address "564" to a predetermined physical address of the second memory chip 12 in data table TB. As another example, the controller 220 may change the physical address "PA80" corresponding to the logical address "98" whose data is older than that of the logical address "564" to a predetermined physical address of the second memory chip 12 in data table TB. For example, the predetermined physical address is the physical address "240" corresponding to the logical address "54" of the address data item having the least count value "7" in conversion table NTB2 of the second memory chip 12 as the destination of change.

As shown in FIG. 11B, the controller 220 replaces the physical address "PA80" corresponding to the first memory chip 11 with the physical address "PA240" corresponding to the second memory chip 12 in the address data item corresponding to the logical address "98" of data table TB.

In data table TB, the controller 220 changes the physical address "PA80" corresponding to the logical address "98" to the physical address "240". In data table TB, the controller 220 changes the chip address of the logical address "98" from "1" to "2".

The controller 220 changes the physical address "PA240" corresponding to the logical address "54" to the physical address "PA80". The controller 220 changes the chip address of the logical address "54" from "2" to "1" in data table NTB2. The controller 220 writes an address data item corresponding to the logical address "54" to data table NTB1. The controller 220 may erase the address data item corresponding to the logical address "54" from data table NTB2, or may retain the address data item.

For example, the controller 220 replaces the data written to the area of user data area UA1 corresponding to the physical address "PA80" with the data of the area of user data area UA2 corresponding to the physical address "PA240".

In the present embodiment, the memory device 1 is allowed to change a physical address corresponding to a logical address of an address data item having a great count value to a physical address corresponding to another memory chip. Thus, the memory device 1 is allowed to cause a plurality of physical addresses corresponding to logical addresses of address data items having great count values to be distributed to a plurality of memory chips. In this way, the memory device 1 is capable of accessing physical addresses corresponding to logical addresses of address data items having great count values at the same time. As a result, the access performance of the memory device 1 can be improved in comparison with the memory device 1 of each of the embodiments explained earlier.

Fourth Embodiment

FIG. 12 is a block diagram showing an example of the configuration of a memory device 1 according to a fourth embodiment. The memory device 1 of the fourth embodiment is allowed to access a physical address corresponding to a logical address of an address data item having a great count value at high speed. Further, the memory device 1 changes the physical address to a physical address corresponding to an area having a high durability. In this respect, the memory device 1 of the fourth embodiment is different from the memory device of each of the embodiments explained earlier.

In the memory device 1 of the present embodiment, a first memory chip 11 included in a nonvolatile memory 10 comprises a multi-level cell (MLC) area M11 in a user data area UA2. A second memory chip 12 comprises an MLC area M12 and a single-level cell (SLC) area S12 in a user data area UA2. The SLC area is an area set to a writing system excellent at access speed and durability, in other words, an SLC system. The MLC area is an area set to a writing system in which a large amount of data can be written, in other words, an MLC system.

An address changing unit 227 holds a threshold for the count value for changing the correspondence relationship between logical addresses and physical addresses in a conversion table, and compares the threshold with the count values of the address data items stored in a data table TB of a volatile memory 210. In the present embodiment, the threshold is used as a reference value for changing a physical address corresponding to an area set to an MLC system to a physical address corresponding to an area set to an SLC system. When a count value greater than the threshold is detected as a result of comparison, the address changing unit 227 detects a physical address corresponding to the logical address of the address data item having the count value greater than the threshold, and a writing system set to an area corresponding to the physical address. When the address changing unit 227 detects that the writing system set to the area corresponding to the physical address is an MLC system, the address conversion unit 227 changes the physical address corresponding to the area set to an MLC system to a physical address corresponding to an area set to an SLC system.

Figure 13A:
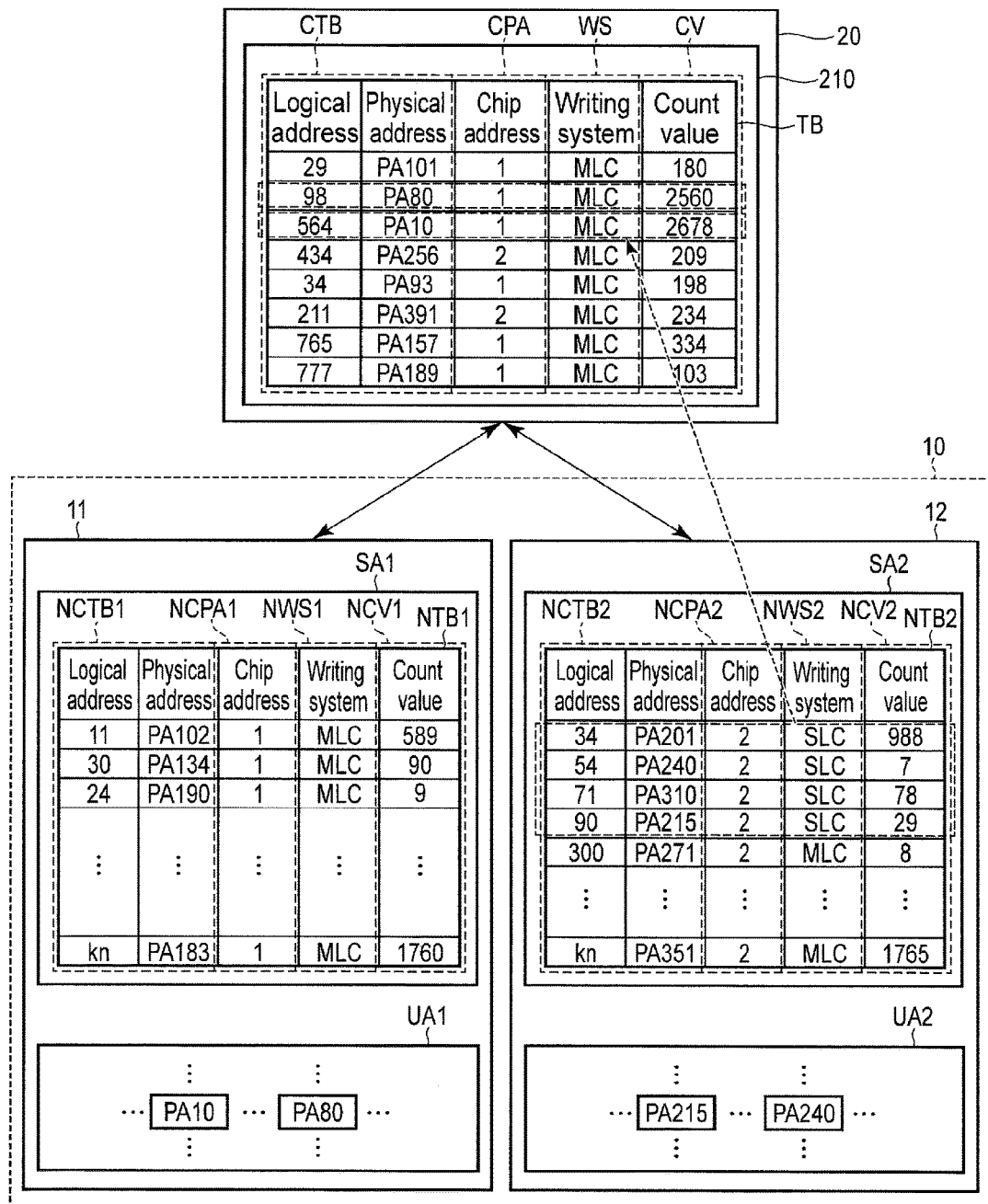
FIG. 13A shows an example of a process for changing an address in the memory device according to the fourth embodiment.
Figure 13B:
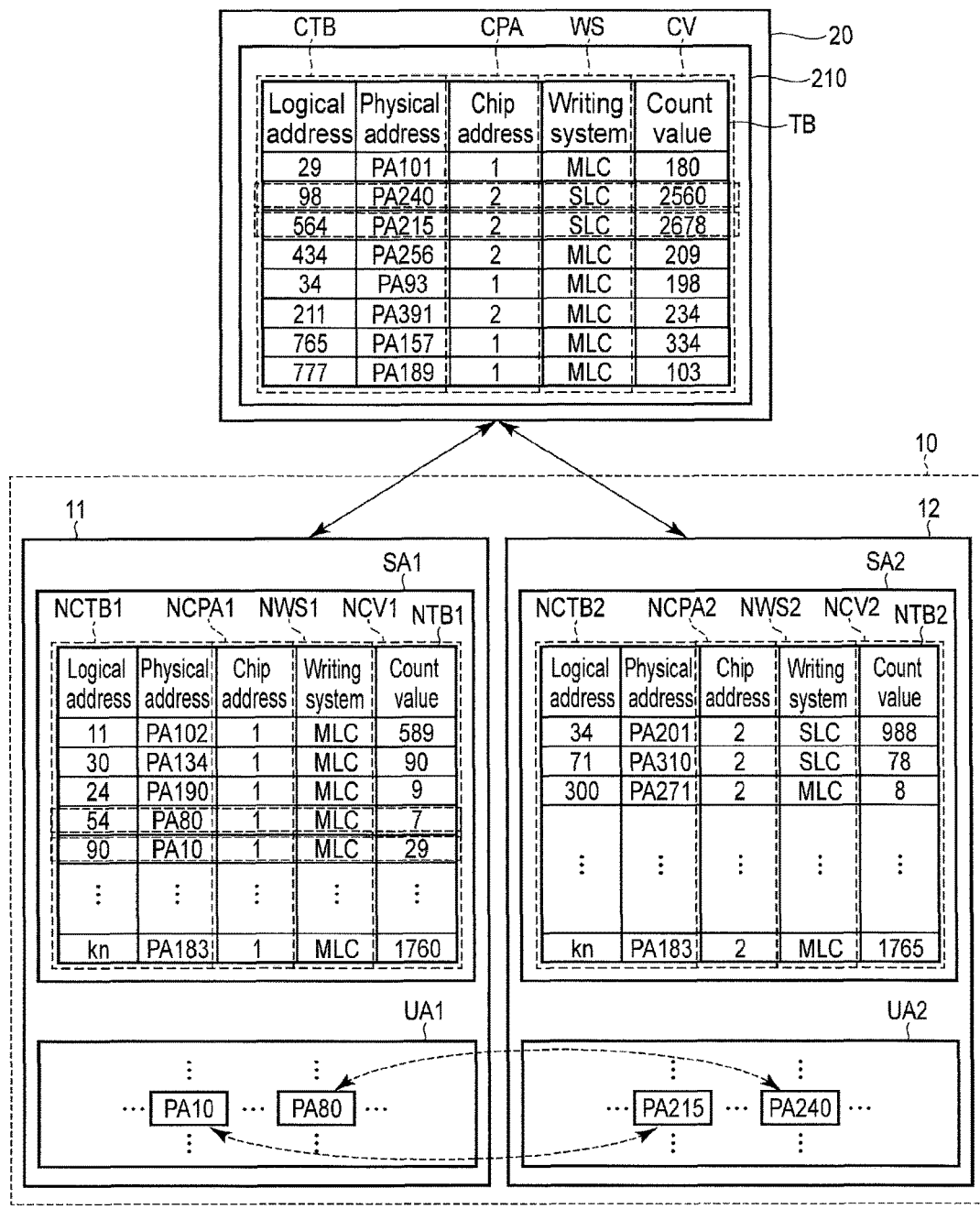
FIG. 13B shows the example of the process for changing the address in the memory device according to the fourth embodiment.

FIG. 13A and FIG. 13B show an example of a process for changing an address in the memory device 1 according to the fourth embodiment. FIG. 13A shows a state in which areas corresponding to the physical addresses of two address data items having count values greater than the threshold are areas set to an MLC system. FIG. 13B shows a state in which the physical addresses of the two address data items having the count values greater than the threshold are changed to physical addresses corresponding to areas set to an SLC system. In FIG. 13A and FIG. 13B, writing systems WS, NWS1 and NWS2 indicate writing systems set to areas corresponding to physical addresses.

As shown in FIG. 13A, when there is no access request from a host 3, the controller 220 compares the threshold for changing the correspondence relationship between logical addresses and physical addresses in a conversion table, for example, the count value "2500", with the count values of the eight address data items stored in data table TB. When the count values "2560" and "2678" greater than the threshold are detected as a result of comparison, the controller 220 detects the logical address "98" of the address data item of the count value "2560", and the logical address "564" of the address data item of the count value "2678". The controller 220 refers to data table TB. The controller 220 detects the physical address "PA80" corresponding to the logical address "98", and the writing system "MLC" set to an area corresponding to the physical address "PA80". Further, the controller 220 detects the physical address "PA10" corresponding to the logical address "564", and the writing system "MLC" set to an area corresponding to the physical address "PA10". In the example shown in the figure, the controller 220 detects that the writing system set to the physical address "PA80" and the writing system set to the physical address "PA10" are an MLC system. For example, the controller 220 reads a data table NTB of the memory chip 12 comprising the SLC area S12, and detects a plurality of physical addresses corresponding to areas set to an SLC system. The controller 220 detects the logical address "54" of the address data item having the least count value among the logical addresses corresponding to the physical addresses, and the logical address "90" of the address data item having the second least count value.

As shown in FIG. 13B, the controller 220 replaces the physical address "PA80" corresponding to the area set to an MLC system with the physical address "PA240" corresponding to the area set to an SLC system in the address data item corresponding to the logical address "98" of data table TB. The controller 220 replaces the physical address "PA10" corresponding to the area set to an MLC with the physical address "PA215" corresponding to the area set to an SLC system in the address data item corresponding to the logical address "564" of data table TB.

The controller 220 changes the physical address "PA80" corresponding to the logical address "98" to the physical address "PA240" in data table TB. The controller 220 changes the chip address from "1" to "2" in data table TB. The controller 220 changes the writing system from "MLC" to "SLC" in change table TB.

The controller 220 changes the physical address "PA240" corresponding to the logical address "54" to the physical address "PA80". The controller 220 changes the chip address of the logical address "54" from "2" to "1". The controller 220 changes the wiring system of the logical address "54" from "SLC" to "MLC". The controller 220 writes an address data item corresponding to the logical address "54" to a data table NTB1. The controller 220 may erase the address data item corresponding to the logical address "54" from a data table NTB2, or may retain the address data item.

The controller 220 changes the physical address "PA10" corresponding to the logical address "564" to the physical address "PA215" in data table TB. The controller 220 changes the chip address from "1" to "2" in data table TB. The controller 220 changes the writing system from "MLC" to "SLC" in change table TB.

The controller 220 changes the physical address "PA215" corresponding to the logical address "90" to the physical address "PA10". The controller 220 changes the chip address of the logical address "90" from "2" to "1". The controller 220 changes the writing system of the logical address "90" from "SLC" to "MLC". The controller 220 writes an address data item corresponding to the logical address "90" to data table NTB1. The controller 220 may erase the address data item corresponding to the logical address "90" from data table NTB2, or may retain the address data item.

The controller 220 replaces the data written to the area corresponding to the physical address "PA80" in the MLC area M11 of a user data area UA1 with the data of the area corresponding to the physical address "PA240" in the SLC area S12 of user data area UA2. The controller 220 replaces the data written to the area corresponding to the physical address "PA10" in the MLC area M11 of user data area UA1 with the data of the area corresponding to the physical address "PA215" in the SLC area S12 in user data area UA2.

In the present embodiment, the memory device 1 is allowed to access a physical address corresponding to a logical address having a great count value at high speed, and change the physical address to a physical address corresponding to an area having a high durability. Thus, it is possible to improve the access speed of the memory device 1 to an area of a physical address corresponding to a logical address having a great count value. Moreover, the reliability of data of an area of a physical address corresponding to a logical address having a great count value is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a nonvolatile memory;
a volatile memory; and
a controller which writes a first data table including a first data group comprising a first conversion table including a first logical address corresponding to a first physical address set in a first area of the nonvolatile memory and a first count value as the number of read requests for the first logical address and a second data group comprising a second conversion table including a second logical address corresponding to a second physical address set in a second area of the nonvolatile memory and a second count value as the number of read requests for the second logical address, to the volatile memory,
reads the first data table when a third logical address corresponding to a third physical address set in a third area of the nonvolatile memory is requested to be read,
compares the first count value and the second count value with each other if the third logical address is not detected in the first data table, and
rewrites the first data group or the second data group of the first data table to a third data group comprising a third conversion table including a third logical address and a third count value as the number of read requests for the third logical address based on a result of the comparison.

2. The memory device of claim 1, wherein
the controller rewrites the second data group of the first data table to the third data group when the second count value is less than the first count value.

3. The memory device of claim 2, wherein
the nonvolatile memory includes a second data table comprising the first data group, the second data group and the third data group,
the controller reads the first data group, the second data group and the third data group from the second data table.

4. The memory device of claim 2, wherein
the controller comprises a memory, stores the first logical address and the second logical address as data different from those of the first data table in the memory when the first count value is next less to the second count value in the first data table.

5. The memory device of claim 2, wherein
the controller comprises a threshold for the number of read requests for rewriting data, and reads the first data table and compares the threshold with the first count value, and when the first count value greater than the threshold is detected, the controller reads the first logical address corresponding to the first count value, reads the first physical address corresponding to the first logical address, and rewrites data written in the first area corresponding to the first physical address.

6. The memory device of claim 1, wherein
the controller compares a first address value of the first logical address and a second address value of the second logical address with each other when the first count value is equal to the second count value, and rewrites the second data group of the first data table to the third data group when the second address value is less than the first address value.

7. The memory device of claim 1, wherein
the controller compares the first data group and the second data group with each other when the first count value is equal to the second count value, and rewrites the second data group of the first data table to the third data group when the second data group is written in the first data table before the first data group.

8. The memory device of claim 2, wherein
the nonvolatile memory comprises a first storage medium and a second storage medium,
the controller comprises a threshold for changing a corresponding relationship between a logical address and a physical address, reads the first data table, and compares the threshold with the first count value and the third count value,
when the first count value and the third count value are detected to be greater than the threshold, the controller detects the first logical address corresponding to the first count value, the first area where the first physical address corresponding to the first logical address is set, the third logical address corresponding to the third count value, and the third area where the third physical address corresponding to the third logical address is set, and
when the first area and the third area are detected to be included in the first storage medium, the controller associates the first logical address or the third logical address with a fourth physical address set in a fourth area of the second storage medium.

9. The memory device of claim 2, wherein
the nonvolatile memory comprises a first storage area to which data is written in an MLC system, and a second storage area to which data is written in an SLC system,
the controller comprises a threshold for changing a corresponding relationship between a logical address and a physical address, reads the first data table, and compares the threshold with the first count value and the third count value,
when the first count value and the third count value are detected to be greater than the threshold, the controller detects the first logical address corresponding to the first count value, the first area where the first physical address corresponding to the first logical address is set, the third logical address corresponding to the third count value, and the third area where the third physical address corresponding to the third logical address is set, and
when the first area and the third area are detected to be included in the first storage area, the controller associates the first logical address with a fourth physical address set in a fourth area of the second storage area, and the third logical address with a fifth physical address set in a fifth area of the second storage area.

10. A read processing method applied to a memory device comprising a non-volatile memory and a volatile memory, the method comprising:
writing a first data table including a first data group comprising a first conversion table including a first logical address corresponding to a first physical address set in a first area of the nonvolatile memory and a first count value as the number of read requests for the first logical address and a second data group comprising a second conversion table including a second logical address corresponding to a second physical address set in a second area of the nonvolatile memory and a second count value as the number of read requests for the second logical address, to the volatile memory;
reading the first data table when a third logical address corresponding to a third physical address set in a third area of the nonvolatile memory is requested to be read,
comparing the first count value and the second count value with each other if the third logical address is not detected in the first data table, and
rewriting the first data group or the second data group of the first data table to a third data group comprising a third conversion table including a third logical address and a third count value as the number of read requests for the third logical address based on a result of the comparing.

11. The read processing method of claim 10, further comprising:
rewriting the second data group of the first data table to the third data group when the second count value is less than the first count value.

12. The read processing method of claim 11, further comprising:
reading the first data group, the second data group and the third data group from a second data table stored in the nonvolatile memory and comprising the first data group, the second data group and the third data group.

13. The read processing method of claim 11, further comprising:
storing the first logical address and the second logical address as data different from those of the first data table in a memory when the first count value is next less to the second count value in the first data table.

14. The read processing method of claim 11, further comprising:
setting a threshold for the number of read requests for rewriting data,
reading the first data table;
comparing the threshold with the first count value; and
reading the first logical address corresponding to the first count value, the first physical address corresponding to the first logical address and rewriting data written in the first area corresponding to the first physical address, when the first count value is detected to be greater than the threshold.

15. The read processing method of claim 10, further comprising:
comparing a first address value of the first logical address and a second address value of the second logical address with each other when the first count value is equal to the second count value; and
rewriting the second data group of the first data table to the third data group when the second address value is less than the first address value.

16. The read processing method of claim 10, further comprising:
comparing the first data group and the second data group with each other when the first count value is equal to the second count value, and
rewriting the second data group of the first data table to the third data group when the second data group is written in the first data table before the first data group.

17. The read processing method of claim 11, further comprising:
setting a threshold for changing a corresponding relationship between a logical address and a physical address;
reading the first data table;
comparing the threshold with the first count value and the third count value;
detecting the first logical address corresponding to the first count value, the first area where the first physical address corresponding to the first logical address is set, the third logical address corresponding to the third count value, and the third area where the third physical address corresponding to the third logical address is set, when the first count value and the third count value are detected to be greater than the threshold;
associating the first logical address or the third logical address to a fourth physical address set in a fourth area of the second storage medium of the non-volatile memory when the first area and the third area are detected to be included in the first storage medium.

18. The read processing method of claim 11, further comprising:
setting a threshold for changing a corresponding relationship between a logical address and a physical address;
reading the first data table;
comparing the threshold with the first count value and the third count value;
detecting the first logical address corresponding to the first count value, the first area where the first physical address corresponding to the first logical address is set, the third logical address corresponding to the third count value, and the third area where the third physical address corresponding to the third logical address is set, when the first count value and the third count value are detected to be greater than the threshold;
associating the first logical address with a fourth physical address set in a fourth area of the second storage area of the non-volatile memory, to which data is written in an SLC system, and the third logical address with a fifth physical address set in a fifth area of the second storage area, when the first area and the third area are detected to be included in the first storage area of the non-volatile memory, to which data is written in the MLC system.

19. A memory device comprising:
a nonvolatile memory including a first storage medium and a second storage medium; and
a controller which reads a first data table including a first data group comprising a first conversion table including a first logical address corresponding to a first physical address set in a first area of the first storage medium and a first count value as the number of read requests for the first logical address and a second data group comprising a second conversion table including a second logical address corresponding to a second physical address set in a second area of the first storage medium and a second count value as the number of read requests for the second logical address,
compares a threshold for changing a corresponding relationship between a logical address and a physical address with the first count value and the second count value;
detects the first logical address corresponding to the first count value, the first area where the first physical address corresponding to the first logical address is set, the second logical address corresponding to the second count value, and
the second area where the second physical address corresponding to the second logical address is set, when the first count value and the second count value are detected to be greater than the threshold, and
associates the first logical address or the second logical address with a third physical address set in a third area of the second storage medium when the first area and the second area are detected to be included in the first storage medium.

20. The memory device of claim 19, further comprising:
a volatile memory,
wherein
the controller reads the first data table from the volatile memory.

* * * * *